US012780956B2

(12) United States Patent
Lee et al.

(10) Patent No.: US 12,780,956 B2
(45) Date of Patent: Nov. 3, 2026

(54) TRANSITION METAL COMPOUND, CATALYST COMPRISING SAME, AND METHOD FOR PREPARING SAME

(71) Applicant: HANWHA SOLUTIONS CORPORATION, Seoul (KR)

(72) Inventors: Won Jong Lee, Daejeon (KR); Taeho Jeong, Daejeon (KR); Ji Min Han, Daejeon (KR); Wook Jeong, Daejeon (KR); Ranwha Park, Daejeon (KR); Seongyeon Park, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 657 days.

(21) Appl. No.: 18/038,482

(22) PCT Filed: Nov. 15, 2021

(86) PCT No.: PCT/KR2021/016637
§ 371 (c)(1),
(2) Date: May 24, 2023

(87) PCT Pub. No.: WO2022/114635
PCT Pub. Date: Jun. 2, 2022

(65) Prior Publication Data

US 2024/0010760 A1 Jan. 11, 2024

(30) Foreign Application Priority Data

Nov. 25, 2020 (KR) ........................ 10-2020-0159425

(51) Int. Cl.

| | |
|---|---|
| ***C08F 4/6592*** | (2006.01) |
| ***C07F 7/00*** | (2006.01) |
| ***C07F 17/00*** | (2006.01) |
| ***C08F 4/02*** | (2006.01) |
| ***C08F 4/659*** | (2006.01) |
| ***C08F 10/00*** | (2006.01) |

(52) U.S. Cl.
CPC .......... *C08F 4/65927* (2013.01); *C08F 4/025* (2013.01); *C08F 4/65912* (2013.01); *C08F 4/65916* (2013.01)

(58) Field of Classification Search
CPC .................. C08F 4/65927; C08F 4/025; C08F 4/65912; C08F 4/65916; C08F 4/65904; C08F 10/00; C07F 17/00; C07F 7/00
See application file for complete search history.

(56) References Cited

FOREIGN PATENT DOCUMENTS

| | | | |
|---|---|---|---|
| CN | 1328580 | A | 12/2001 |
| CN | 104245702 | A | 12/2014 |
| CN | 111484573 | A | 8/2020 |
| JP | 2002-528463 | A | 9/2002 |
| JP | 2015174859 | A | * 10/2015 |
| JP | 2018-141098 | A | 9/2018 |
| KR | 10-2001-0099705 | A | 11/2001 |
| KR | 10-2016-0103042 | A | 8/2016 |

OTHER PUBLICATIONS

Japanese Office Action issued Jun. 4, 2024 in Application No. 2023-531636.
International Search Report for PCT/KR2021/016637 dated Mar. 2, 2022.
Zhang et al., "Diels-Alder Reaction of o-Carboryne with Fulvenes: Synthesis of Carboranonorbornadienes and Their Transformations", ChemPlusChem Full Papers, vol. 79, 2014, pp. 1044-1052, DOI: 10.1002/cplu.201402129.
Communication issued Jan. 8, 2025 in Chinese Application No. 202180079382.X.

* cited by examiner

*Primary Examiner* — Yong L Chu
(74) *Attorney, Agent, or Firm* — Sughrue Mion, PLLC

(57) ABSTRACT

A transition metal compound and an olefin polymerization catalyst containing the transition metal compound are disclosed. A method for preparing the transitional metal and a method for preparing the catalyst are disclosed. The transition metal compound has a carbon-bridged cyclopentadienyl-fluorenyl skeleton bearing a substituted bisphenyl group. The olefin polymerization catalyst contains the transition metal compound and a cocatalyst compound.

19 Claims, No Drawings

TRANSITION METAL COMPOUND, CATALYST COMPRISING SAME, AND METHOD FOR PREPARING SAME

CROSS REFERENCE TO RELATED APPLICATIONS

This application is a National Stage of International Application No. PCT/KR2021/016637 filed Nov. 15, 2021, claiming priority based on Korean Patent Application No. 10-2020-0159425 filed Nov. 25, 2020.

TECHNICAL FIELD

The present invention relates to a transition metal compound, an olefin polymerization catalyst comprising the same, and a method for preparing the same. Specifically, the present invention relates to a transition metal compound having a carbon-bridged cyclopentadienyl-fluorenyl skeleton bearing a substituted bisphenyl group, an olefin polymerization catalyst comprising the same, and a method for preparing the transition metal compound and catalyst.

BACKGROUND ART

Polyolefin-based polymers are widely used in real life as materials such as shopping bags, vinyl houses, fishing nets, cigarette wrappers, ramen bags, yogurt bottles, battery cases, automobile bumpers, interior materials, shoes soles, and washing machines.

Conventional polyolefin-based polymers such as polyethylene, polypropylene, and ethylene-alpha olefin copolymers and copolymers thereof were prepared using a heterogeneous catalyst such as a Ziegler-Natta catalyst composed of a titanium compound and an alkyl aluminum compound.

Recently, a method for producing polyolefin using a metallocene catalyst, which is a homogeneous catalyst having very high catalytic activity, has been studied. The metallocene catalyst is a compound in which a ligand such as cyclopentadienyl, indenyl, or cycloheptadienyl is coordinated to a transition metal or transition metal halogenated compound, and has a sandwich structure as a basic form. Here, the metallocene catalyst has various molecular structures depending on a shape of a ligand and the type of central metal.

Since a Ziegler-Natta catalyst, which is a heterogeneous catalyst, is dispersed on a solid surface in which a metal component, which is an active site, is inert, the nature of the active site is not uniform. In contrast, since the metallocene catalyst is a single compound having a certain structure, it is known as a single-site catalyst having the same polymerization characteristics at all active sites.

In general, since the metallocene catalyst is inactive as a polymerization catalyst by itself, it is used together with a cocatalyst such as methyl aluminoxane. The metallocene catalyst is activated with a cation by action of the cocatalyst, and at the same time, the cocatalyst is an anion that is not coordinated to the metallocene catalyst and stabilizes unsaturated cationic active species to form a catalyst system having activity in various olefin polymerizations.

Such a metallocene catalyst is easy to copolymerize and may control a three-dimensional structure of a polymer according to the symmetry of the catalyst, and the polymer prepared therefrom has an advantage that a molecular weight distribution is narrow and distribution of a comonomer is uniform.

However, there is still a need for a metallocene catalyst for olefin polymerization that has a high activity and is capable of further improving copolymerizability and preparing a high molecular weight resin.

DISCLOSURE

Technical Problem

An object of the present invention is to provide a transition metal compound for olefin polymerization catalyst that has a high activity, is capable of preparing a resin having excellent physical properties, and has a novel structure, and an olefin polymerization catalyst comprising the same.

Another object of the present invention is to provide a method for preparing the transition metal compound and an olefin polymerization catalyst comprising the same.

Technical Solution

In one general aspect, there is provided a transition metal compound represented by the following Formula 1:

[Formula 1]

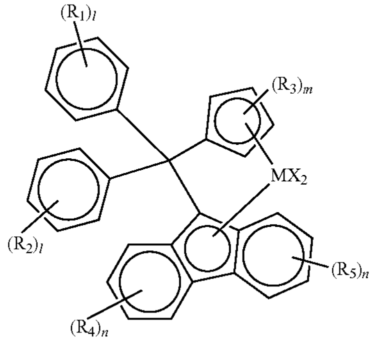

wherein l is each independently an integer from 0 to 5, provided that at least one is not 0, and m and n are each independently an integer from 0 to 4, M is titanium (Ti), zirconium (Zr), or hafnium (Hf), X is each independently a halogen, nitro, $C_{1-20}$alkyl, $C_{2-20}$alkenyl, $C_{2-20}$alkynyl, $C_{6-20}$aryl, $C_{1-20}$alkyl$C_{6-20}$aryl, $C_{6-20}$aryl$C_{1-20}$alkyl, $C_{1-20}$alkylamido, $C_{6-20}$arylamido, $C_{1-20}$sulfonate, or $C_{1-20}$sulfonamide, at least one of $R_1$ and $R_2$ is an alkenyl group selected from substituted or unsubstituted $C_{2-20}$alkenyl, substituted or unsubstituted $C_{2-20}$cycloalkenyl, substituted or unsubstituted $C_{1-20}$alkenyl$C_{6-20}$aryl, substituted or unsubstituted $C_{6-20}$aryl$C_{1-20}$alkenyl, substituted or unsubstituted $C_{1-20}$cycloalkenyl$C_{6-20}$aryl, and substituted or unsubstituted $C_{6-20}$aryl$C_{1-20}$cycloalkenyl, provided that when only one of $R_1$ and $R_2$ is an alkenyl group, the other of $R_1$ and $R_2$ may be hydrogen, substituted or unsubstituted $C_{1-20}$alkyl, substituted or unsubstituted $C_{6-20}$aryl, substituted or unsubstituted $C_{1-20}$alkyl$C_{6-20}$aryl, substituted or unsubstituted $C_{6-20}$aryl$C_{1-20}$alkyl, substituted or unsubstituted $C_{1-20}$heteroalkyl, substituted or unsubstituted $C_{3-20}$heteroaryl, substituted or unsubstituted $C_{1-20}$alkylamido, substituted or unsubstituted $C_{6-20}$arylamido, substituted or unsubstituted $C_{1-20}$alkylidene, or substituted or unsubstituted $C_{1-20}$silyl, and $R_3$ to $R_5$ are each independently hydrogen, substituted or unsubstituted $C_{1-20}$alkyl, substituted or unsubstituted $C_{6-20}$aryl, substituted or unsubstituted $C_{1-20}$alkyl$C_{6-20}$ aryl, substituted or unsubstituted $C_{6-20}$aryl$C_{1-20}$alkyl, substituted or unsubstituted $C_{1-20}$heteroalkyl, substituted or unsubstituted $C_{3-20}$heteroaryl, substituted or unsubstituted $C_{1-20}$alkylamido, substituted or unsubstituted $C_{6-20}$arylamido, substituted or unsubstituted $C_{1-20}$alkylidene, or substituted or unsubstituted $C_{1-20}$silyl, provided that $R_3$ to $R_5$ may each independently connect adjacent groups to form a substituted or unsubstituted, saturated or unsaturated $C_{4-2}o$ ring.

In an embodiment of the present invention, in Formula 1 above, each 1 may be 1, each of m and n may be 0 or 1, M may be zirconium or hafnium, each X may be a halogen, or substituted or unsubstituted $C_{1-20}$alkyl, each of $R_1$ and $R_2$ may be substituted or unsubstituted $C_{2-20}$alkenyl, substituted or unsubstituted $C_{2-20}$cycloalkenyl, or substituted or unsubstituted $C_{6-20}$aryl$C_{1-20}$alkenyl, and each of $R_3$ to $R_5$ may be hydrogen, or substituted or unsubstituted $C_{1-20}$alkyl.

In a preferred embodiment of the present invention, the transition metal compound represented by Formula 1 is at least one of transition metal compounds represented by the following Formulas 1-1 to 1-12:

[Formula 1-1]

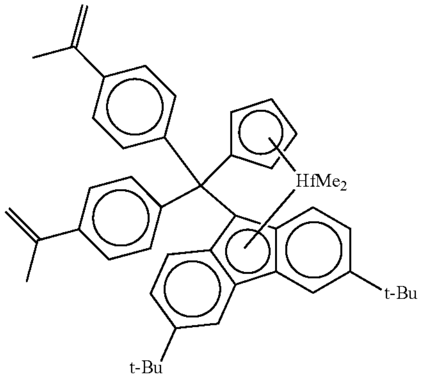

[Formula 1-2]

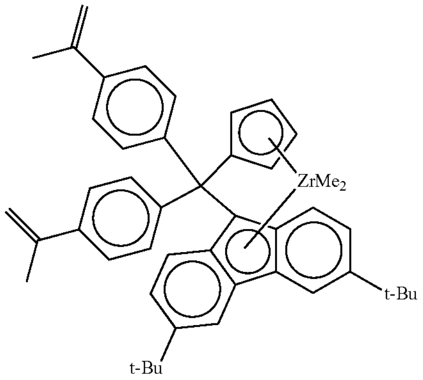

-continued

[Formula 1-3]

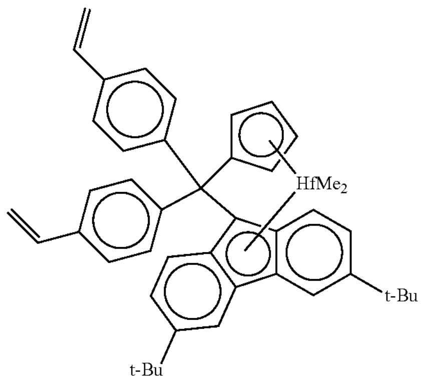

[Formula 1-4]

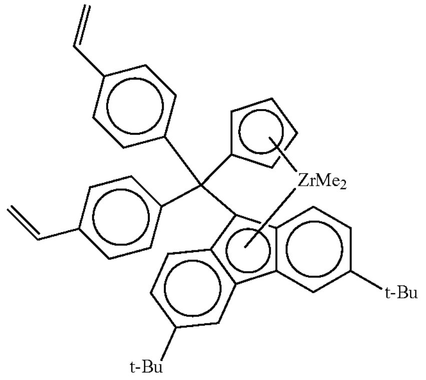

[Formula 1-5]

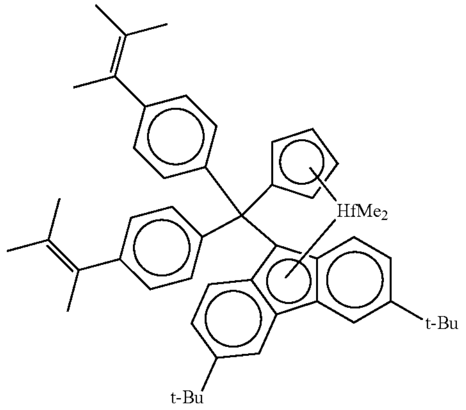

-continued

[Formula 1-6]

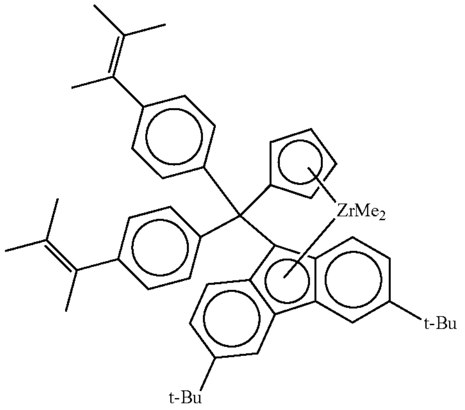

[Formula 1-7]

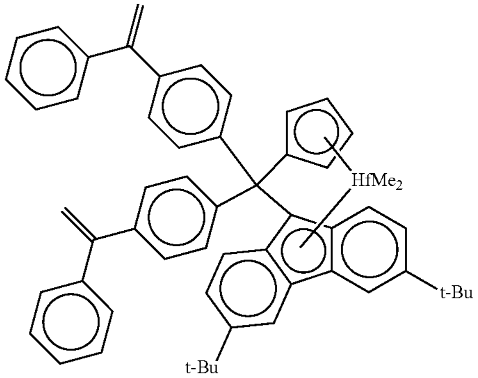

[Formula 1-8]

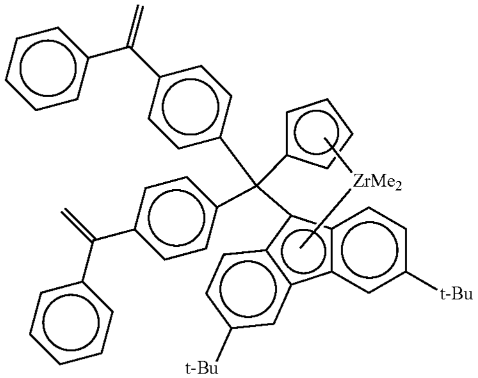

[Formula 1-9]

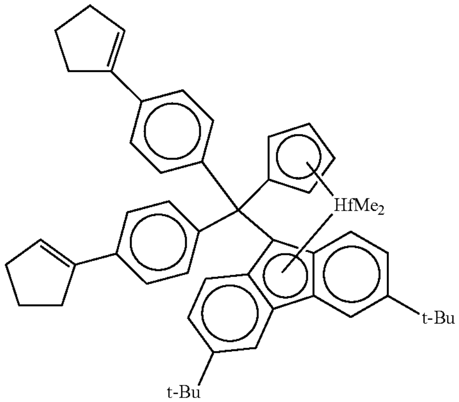

-continued

[Formula 1-10]

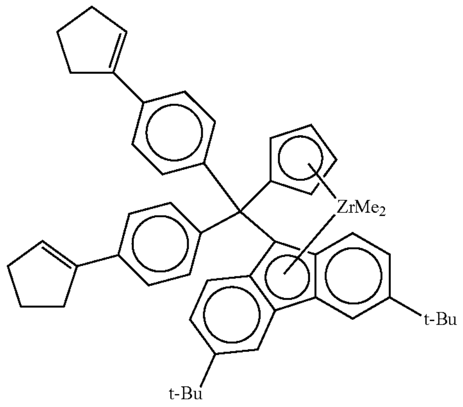

[Formula 1-11]

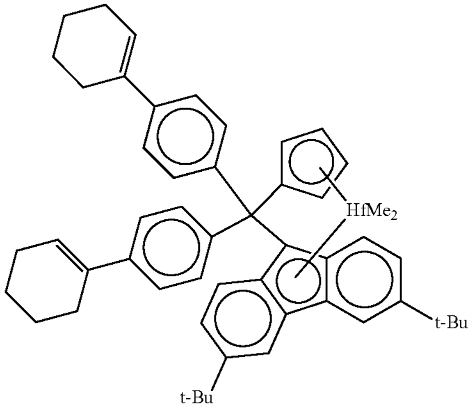

[Formula 1-12]

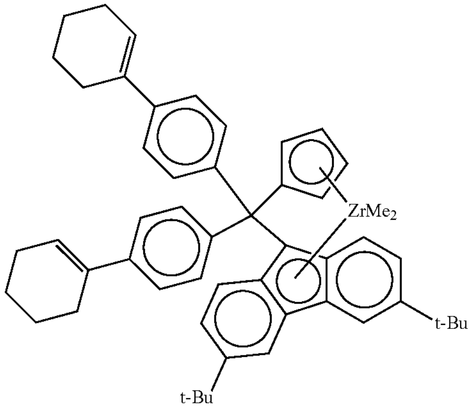

wherein Me is methyl and t-Bu is t-butyl.

In another general aspect, there is provided a method for preparing a transition metal compound, including: (la) reacting a compound represented by the following Formula 2h with a compound represented by the following Formula 3m to obtain a compound represented by the following Formula 4h; (2a) reacting a compound represented by the following Formula 5 with at least one of a lithium compound, a potassium compound, and a sodium compound to obtain a compound represented by the following Formula 5m; (3a) reacting a compound represented by the following Formula 4 h with a compound represented by the following Formula 5m to obtain a compound represented by the following Formula 6h; (4a) reacting the compound represented by the following Formula 6 h with an organic boron compound substituted with $R_1$ or $R_2$ (where $R_1$ and $R_2$ are as described in the section of the transition metal compound) to obtain a compound represented by the following Formula 6; (5) reacting the compound represented by the following Formula 6 with at least one of a lithium compound, a potassium compound, and a sodium compound to obtain a compound represented by the following Formula 6m; and (6) reacting a compound represented by the following Formula 6m with a compound represented by the following Formula 7 or a complex thereof to obtain a transition metal compound represented by the following Formula 1h:

[Formula 2h]

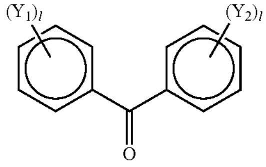

[Formula 3m]

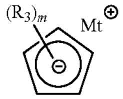

[Formula 4h]

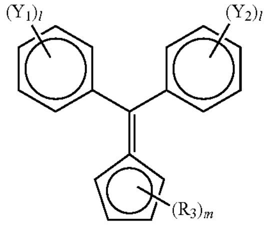

[Formula 5]

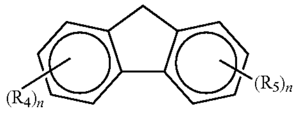

[Formula 5m]

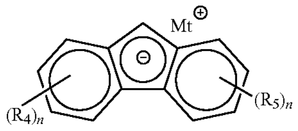

[Formula 6h]

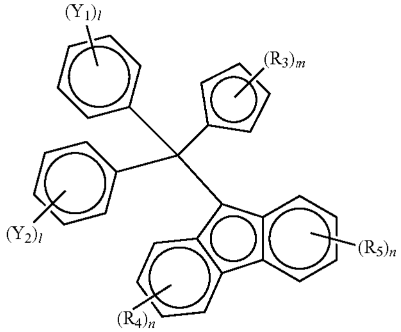

-continued

[Formula 6]

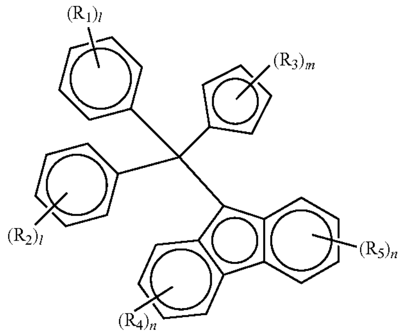

[Formula 6m]

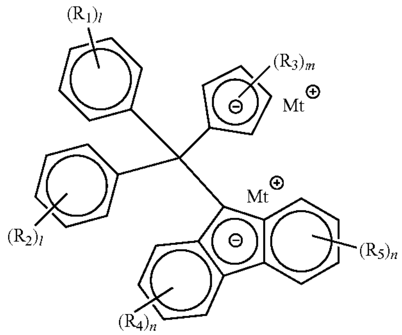

[Formula 7]

$M(X_a)_4$

[Formula 1h]

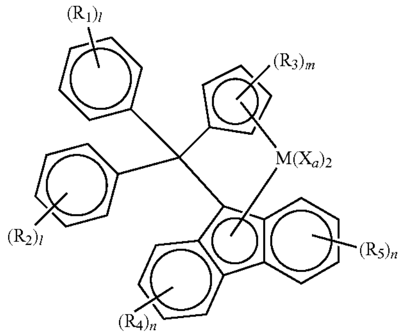

wherein l, m, n, M, and $R_1$ to $R_5$ are as described in the section of the transition metal compound, Mt is one of lithium, potassium and sodium, $Y_1$ and $Y_2$ are each a halogen, $C_{1-20}$sulfonate, or $C_{1-20}$sulfonamide, provided that either $Y_1$ or $Y_2$ may be $R_1$ or $R_2$, and $X_a$ is a halogen, $C_{1-20}$sulfonate, $C_{1-20}$sulfonamide, $C_{6-20}$aryl$C_{1-20}$alkyl, or $C_{1-20}$alkylamido.

In an embodiment of the present invention, the method for preparing a transition metal compound may include, instead of steps (3a) and (4a), (3b) reacting the compound represented by Formula 4 h with an organic boron compound substituted with $R_1$ or $R_2$ (wherein $R_1$ and $R_2$ are as described in the section of the transition metal compound) to obtain a compound represented by the following Formula 4; and (4b) reacting the compound represented by Formula 4 with a compound represented by Formula 5m to obtain a compound represented by Formula 6:

[Formula 4]

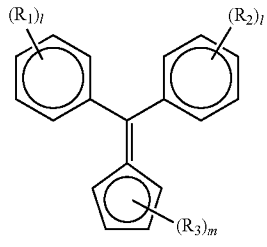

wherein l, m, and $R_1$ to $R_3$ are as described in the section of the transition metal compound.

In an embodiment of the present invention, the method for preparing a transition metal compound may include, instead of steps (1a) to (4a), (2c) reacting a compound represented by the following Formula 2 with the compound represented by Formula 3m to obtain a compound represented by Formula 4; (3c) reacting the compound represented by Formula 5 with at least one of a lithium compound, a potassium compound, and a sodium compound to obtain a compound represented by Formula 5m; and (4c). reacting the compound represented by Formula 4 with the compound represented by Formula 5m to obtain a compound represented by Formula 6:

[Formula 2]

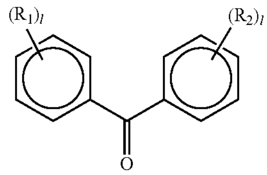

wherein l, $R_1$ and $R_2$ are as described in the section of the transition metal compound.

In an embodiment of the present invention, an organic boron compound substituted with $R_1$ or $R_2$ may be selected from boronic acid, boronic ester, potassium trifluoroborate, alkylborane, boronic acid, and boronic ester substituted with $R_1$ or $R_2$.

In an embodiment of the present invention, the compound represented by Formula 7 may be $HfCl_4$ or $ZrCl_4$.

In an embodiment of the present invention, the method for preparing a transition metal compound may further include: (7a) reacting a compound represented by Formula 1h with a compound represented by the following Formula 8a or a compound represented by the following Formula 9 to obtain a compound represented by the following Formula 1a:

[Formula 8a]

$X_bMgX_c$

[Formula 9]

$X_bLi$

-continued

[Formula 1a]

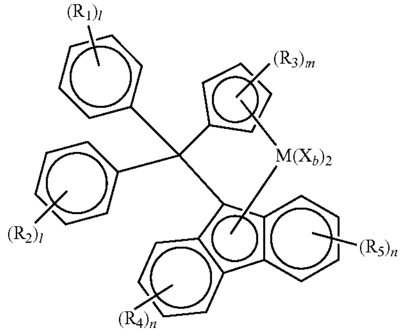

wherein l, m, n, M, and $R_1$ to $R_5$ are as described in the section of the transition metal compound, $X_b$ is each independently $C_{1-20}$alkyl, $C_{2-20}$alkenyl, $C_{2-20}$alkynyl, $C_{6-20}$aryl, $C_{1-20}$alkyl$C_{6-20}$aryl, $C_{6-20}$aryl$C_{1-20}$alkyl, $C_{1-20}$alkylamido, or $C_{6-20}$arylamido, and $X_c$ is a halogen.

In an embodiment of the present invention, the method for preparing a transition metal compound may further include: (7b) reacting the compound represented by Formula 1h with a compound represented by the following Formula 8b to obtain a compound represented by the following Formula 1b:

[Formula 8b]

$(R_n)_3SiX_d$

[Formula 1b]

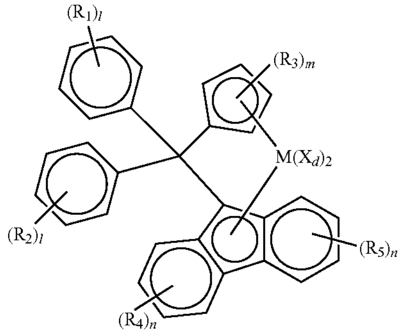

wherein l, m, n, M, and $R_1$ to $R_5$ are as described in the section of the transition metal compound, $R_n$ is each independently $C_{1-20}$alkyl, $C_{2-20}$alkenyl, $C_{2-20}$alkynyl, $C_{6-20}$aryl, $C_{1-20}$alkyl$C_{6-20}$aryl, or $C_{6-20}$aryl$C_{1-20}$alkyl, and $X_d$ is a halogen.

In an embodiment of the present invention, the compound represented by Formula 8a may be MeMgBr, and the compound represented by Formula 9 may be MeLi. In addition, the compound represented by Formula 8b may be $(Me)_3SiCl$.

In another general aspect, there is provided an olefin polymerization catalyst, comprising the transition metal compound represented by Formula 1; and a cocatalyst compound.

In another general aspect, there is provided a method for preparing an olefin polymerization catalyst, including: supporting the transition metal compound represented by Formula 1, a cocatalyst compound, or both on a carrier.

Advantageous Effects

Since the transition metal compound and the olefin polymerization catalyst comprising the same according to an embodiment of the present invention have a unique three-dimensional structure, it is possible to control a molecular weight and copolymerizability of the polymer.

BEST MODE

Hereinafter, the present disclosure will be described in detail.

Transition Metal Compounds

According to an embodiment of the present invention, a transition metal compound represented by the following Formula 1 is provided:

[Formula 1]

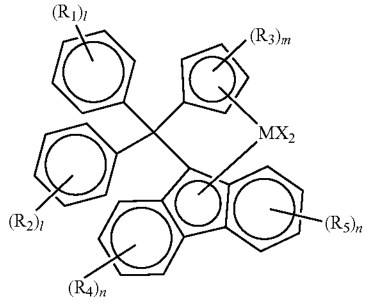

wherein l is each independently an integer from 0 to 5, provided that at least one is not 0, and m and n are each independently an integer from 0 to 4. Specifically, l is 0 or 1, provided that at least one is not 0, and each of m and n is 0 or 1. Preferably, each l is 1, and each of m and n is 0 or 1.

M is titanium (Ti), zirconium (Zr), or hafnium (Hf). Specifically, M may be hafnium or zirconium.

X is each independently a halogen, nitro, $C_{1-20}$alkyl, $C_{2-20}$alkenyl, $C_{2-20}$alkynyl, $C_{6-20}$aryl, $C_{1-20}$alkyl$C_{6-20}$ aryl, $C_{6-20}$aryl$C_{1-20}$alkyl, $C_{1-20}$alkylamido, $C_{6-20}$arylamido, $C_{1-20}$sulfonate, or $C_{1-20}$sulfonamide. Specifically, each X may be a halogen, or substituted or unsubstituted $C_{1-20}$alkyl.

At least one of $R_1$ and $R_2$ is an alkenyl group selected from substituted or unsubstituted $C_{2-20}$alkenyl, substituted or unsubstituted $C_{2-20}$cycloalkenyl, substituted or unsubstituted $C_{1-20}$alkenyl$C_{6-20}$aryl, substituted or unsubstituted $C_{6-20}$aryl$C_{1-20}$alkenyl, substituted or unsubstituted $C_{1-20}$cycloalkenyl$C_{6-20}$aryl, and substituted or unsubstituted $C_{6-20}$aryl$C_{1-20}$cycloalkenyl, provided that when only one of $R_1$ and $R_2$ is an alkenyl group, the other of $R_1$ and $R_2$ may be hydrogen, substituted or unsubstituted $C_{1-20}$alkyl, substituted or unsubstituted $C_{6-20}$aryl, substituted or unsubstituted $C_{1-20}$alkyl$C_{6-20}$aryl, substituted or unsubstituted $C_{6-20}$aryl$C_{1-20}$alkyl, substituted or unsubstituted $C_{1-20}$heteroalkyl, substituted or unsubstituted $C_{3-20}$heteroaryl, substituted or unsubstituted $C_{1-20}$alkylamido, substituted or unsubstituted $C_{6-20}$arylamido, substituted or unsubstituted $C_{1-20}$alkylidene, or substituted or unsubstituted $C_{1-20}$silyl.

$R_3$ to $R_5$ are each independently hydrogen, substituted or unsubstituted $C_{1-20}$alkyl, substituted or unsubstituted $C_6$-2oaryl, substituted or unsubstituted $C_{1-20}$alkyl$C_{6-20}$aryl, substituted or unsubstituted $C_{6-20}$aryl$C_{1-20}$alkyl, substituted or unsubstituted $C_{1-20}$heteroalkyl, substituted or unsubstituted $C_{3-20}$heteroaryl, substituted or unsubstituted $C_{1-20}$alkylamido, substituted or unsubstituted $C_{6-20}$arylamido, substituted or unsubstituted $C_{1-20}$alkylidene, or substituted or unsubstituted $C_{1-20}$silyl.

In addition, $R_3$ to $R_5$ may each independently connect adjacent groups to form a substituted or unsubstituted, saturated or unsaturated $C_4$-$2_o$ ring.

In an embodiment of the present invention, in Formula 1 above, each 1 may be 1, each of m and n may, be 0 or 1, M may be zirconium or hafnium, each X may be a halogen, or substituted or unsubstituted $C_{1-20}$alkyl, each of $R_1$ and $R_2$ may be substituted or unsubstituted $C_{2-20}$alkenyl, substituted or unsubstituted $C_{2-20}$cycloalkenyl, or substituted or unsubstituted $C_{6-20}$aryl$C_{1-20}$alkenyl, and each of $R_3$ to $R_5$ may be hydrogen, or substituted or unsubstituted $C_{1-20}$alkyl.

In a preferred embodiment of the present invention, the transition metal compound represented by Formula 1 may be at least one of transition metal compounds represented by the following Formulas 1-1 to 1-12:

[Formula 1-1]

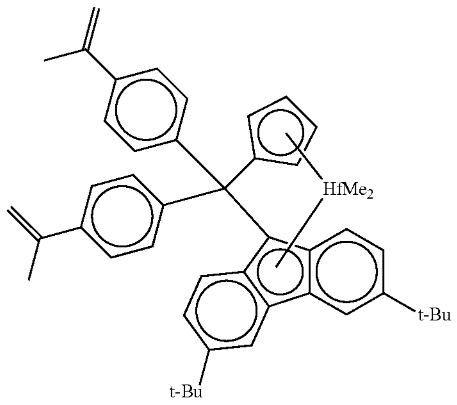

[Formula 1-2]

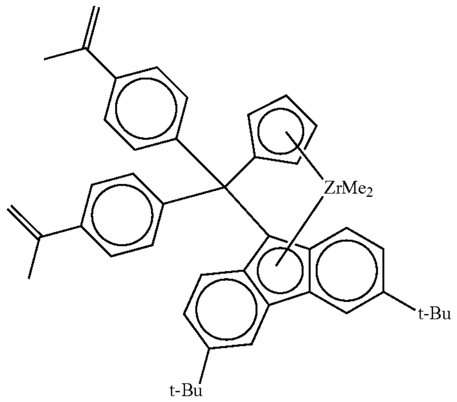

-continued
[Formula 1-3]
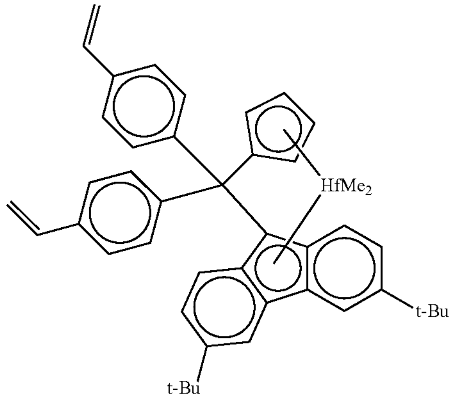
[Formula 1-4]
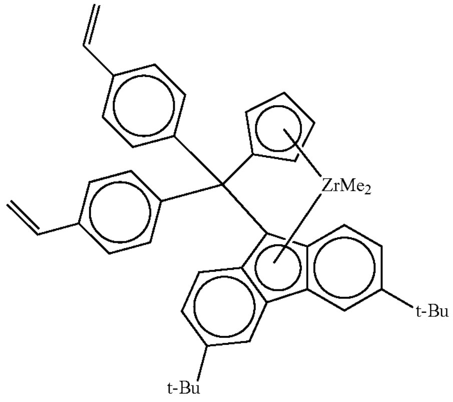
[Formula 1-5]
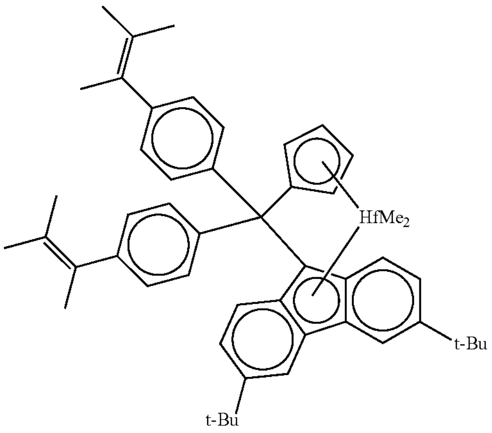
-continued
[Formula 1-6]
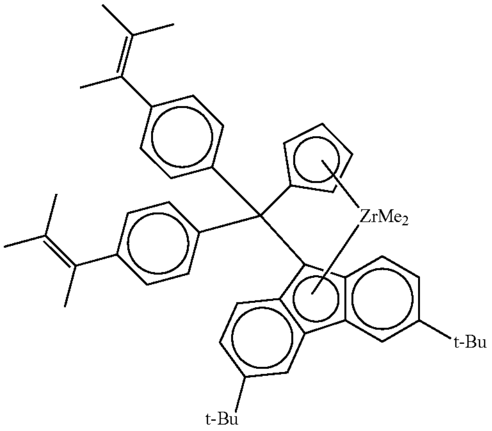
[Formula 1-7]
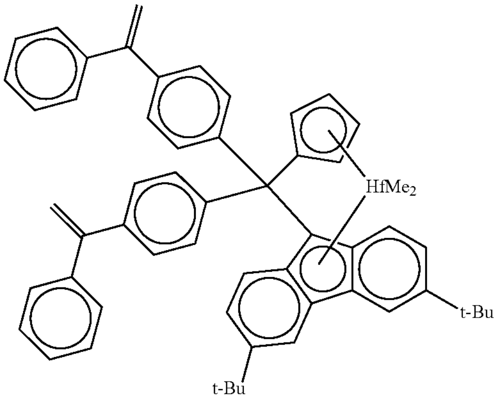
[Formula 1-8]
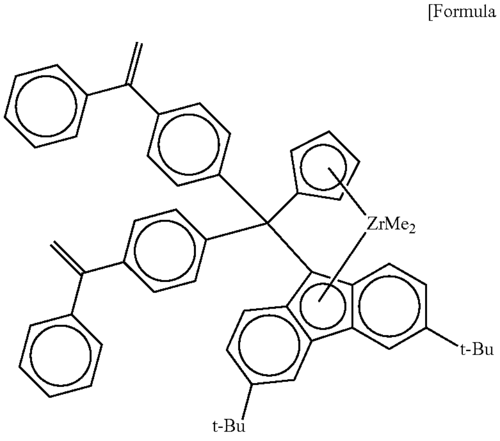

-continued

[Formula 1-9]

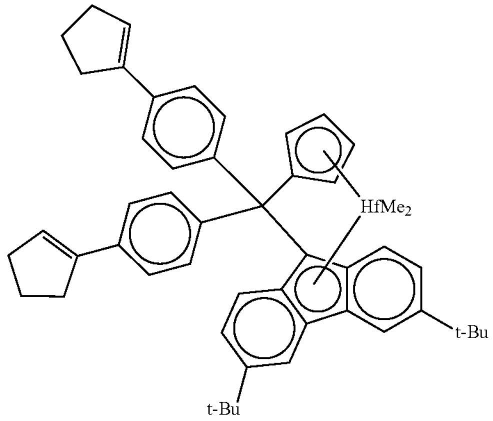

[Formula 1-10]

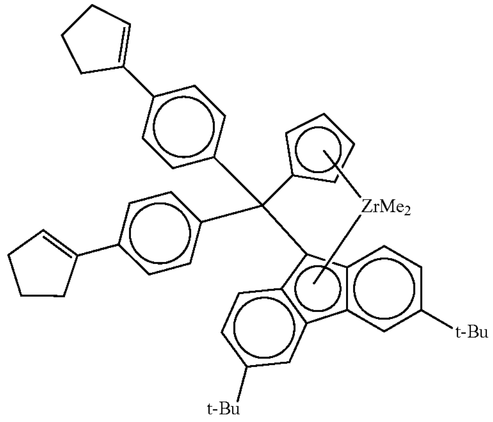

[Formula 1-11]

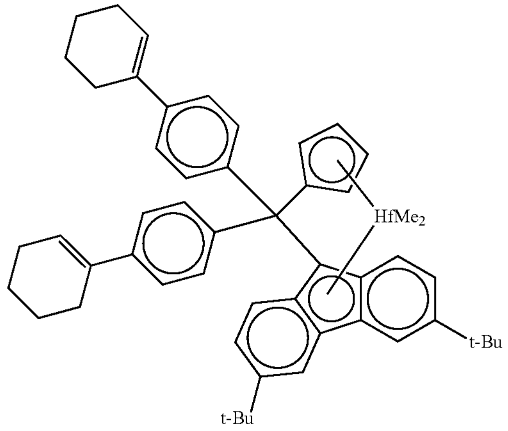

-continued

[Formula 1-12]

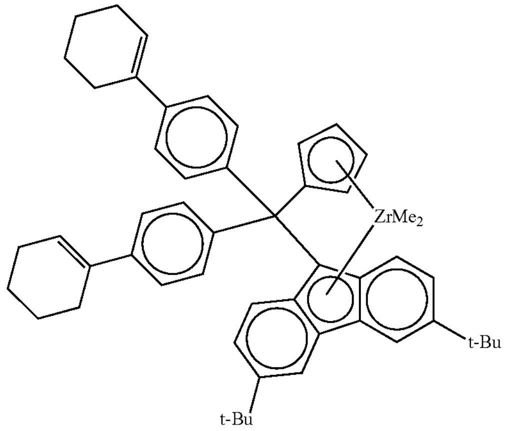

wherein Me is methyl and t-Bu is t-butyl.

Method for Preparing Transition Metal Compound

The transition metal compound according to an embodiment of the present invention may be prepared by a preparation method including the following steps: (1a) reacting a compound represented by the following Formula 2h with a compound represented by the following Formula 3m to obtain a compound represented by the following Formula 4h; (2a) reacting a compound represented by the following Formula 5 with at least one of a lithium compound, a potassium compound, and a sodium compound to obtain a compound represented by the following Formula 5m; (3a) reacting a compound represented by the following Formula 4 h with a compound represented by the following Formula 5m to obtain a compound represented by the following Formula 6h; (4a) reacting the compound represented by the following Formula 6 h with an organic boron compound substituted, with $R_1$ or $R_2$ (where $R_1$ and $R_2$ are as described in the section on the transition metal compound) to obtain a compound represented by the following Formula 6; (5) reacting the compound represented by the following Formula 6 with at least one of a lithium compound, a potassium compound, and a sodium compound to obtain a compound represented by the following Formula 6m; and (6) reacting a compound represented by the following Formula 6m with a compound represented by the following Formula 7 or a complex thereof to obtain a transition metal compound represented by the following Formula 1h:

[Formula 2h]

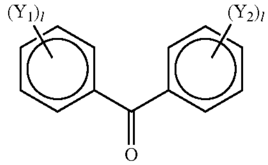

[Formula 3m]

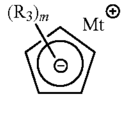

-continued

[Formula 4h]

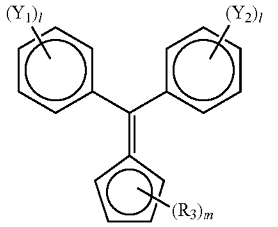

[Formula 5]

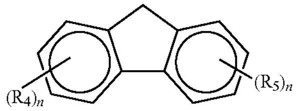

[Formula 5m]

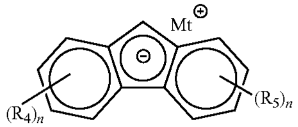

[Formula 6h]

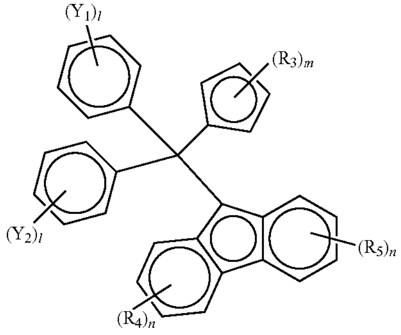

[Formula 6]

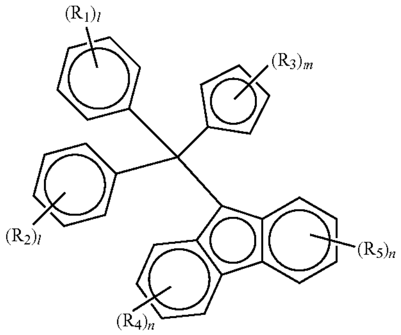

[Formula 6m]

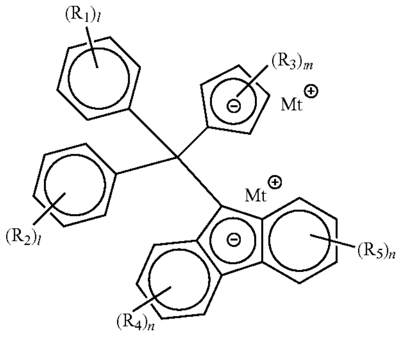

[Formula 7]

$M(X_a)_4$

-continued

[Formula 1h]

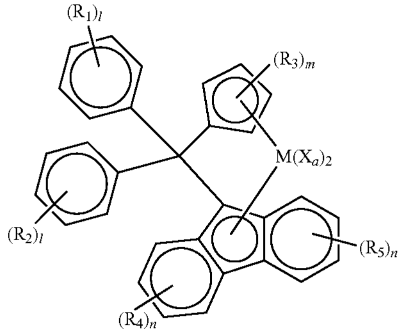

wherein l, m, n, M, and $R_1$ to $R_5$ are as described in the section on the transition metal compound, Mt is one of lithium, potassium and sodium, $Y_1$ and $Y_2$ are each a halogen, $C_{1-20}$sulfonate, or $C_{1-20}$sulfonamide, provided that either $Y_1$ or $Y_2$ may be $R_1$ or $R_2$, and $X_a$ is a halogen, $C_{1-20}$sulfonate, $C_{1-20}$sulfonamide, $C_{1-20}$aryl$C_{1-20}$alkyl, or $C_{1-20}$alkylamido.

Step (1a)

In step (1a) above, the compound represented by Formula 2h and the compound represented by Formula 3m are reacted to obtain a compound represented by Formula 4h.

In an embodiment of the present invention, in the Formulas above, each 1 may be 1, m may be 0, and $Y_1$ and $Y_2$ may be bromine.

In an embodiment of the present invention, the compound represented by Formula 2h and the compound represented by Formula 3m may be dissolved in a solvent before the reaction. Here, examples of the solvent may include, but are not particularly limited to, at least one selected from the group consisting of an aliphatic hydrocarbon solvent such as hexane or pentane, an aromatic hydrocarbon solvent such as toluene or benzene, a hydrocarbon solvent substituted with a chlorine atom such as dichloromethane, an ether-based solvent such as diethyl ether or tetrahydrofuran, acetone, and ethyl acetate. Preferably, the solvent may be tetrahydrofuran.

The temperature at the time of mixing the compound represented by Formula 2h and the compound represented by Formula 3m is preferably in a range of −78 °C to 30 °C. More preferably, the temperature at the time of mixing these two compounds may be −40 °C to 10 °C. Most preferably, the temperature at the time of mixing these two compounds may be about −30 °C.

After mixing the compound represented by Formula 2 h and the compound represented by Formula 3m, the resulting mixture is gradually raised to a temperature of −78 °C to 80 °C, preferably a temperature of −40 °C to 60 °C, and more preferably room temperature, and reacted under stirring for 1 to 24 hours, preferably 1 to 12 hours, and more preferably 1 to 6 hours.

For example, distilled water is added to terminate the reaction, the product is extracted with a solvent such as dichloromethane, dried with, for example, anhydrous sodium sulfate, and then concentrated under reduced pressure. Subsequently, the product may be recrystallized using, for example, dichloromethane and methanol to obtain a compound represented by the Formula 4h.

Step (2a)

In step (2a) above, the compound represented by Formula 5 is reacted with at least one of a lithium compound, a potassium compound, and a sodium compound to obtain a compound represented by Formula 5m.

In an embodiment of the present invention, in the formulas above, each n may be 1, and each of $R_4$ and $R_5$ may be substituted or unsubstituted $C_{1-20}$alkyl. Preferably, each of $R_4$ and $R_5$ may be t-butyl.

In an embodiment of the present invention, at least one of a lithium compound, a potassium compound, and a sodium compound may include at least one of n-butyl lithium, methyl lithium, sodium amide, and potassium hydroxide. Preferably, at least one of a lithium compound, a potassium compound, and a sodium compound may be n-butyllithium.

In an embodiment of the present invention, the compound represented by Formula 5 and at least one of a lithium compound, a potassium compound, and a sodium compound may be dissolved in a solvent before the reaction. Here, examples of the solvent may include, but are not particularly limited to, at least one selected from the group consisting of an aliphatic hydrocarbon solvent such as hexane or pentane, an aromatic hydrocarbon solvent such as toluene or benzene, a hydrocarbon solvent substituted with a chlorine atom such as dichloromethane, an ether-based solvent such as diethyl ether or tetrahydrofuran, acetone, and ethyl acetate. Preferably, the compound represented by Formula 5 may be dissolved in a mixed solution of hexane and ether, and at least one of a lithium compound, a potassium compound, and a sodium compound may be dissolved in hexane.

The temperature at the time of mixing the compound represented by Formula 5 with at least one of a lithium compound, a potassium compound, and a sodium compound is preferably in a range of −78 °C to 30 °C. More preferably, the temperature at the time of mixing these two compounds may be −40 °C to 10 °C. Most preferably, the temperature at the time of mixing these two compounds may be about −30 °C.

After mixing the compound represented by Formula 5 and with at least one of a lithium compound, a potassium compound, and a sodium compound, the resulting mixture is gradually raised to a temperature of −78 °C to 80 °C, preferably a temperature of −40 °C to 60 °C, and more preferably room temperature, and reacted under stirring for 1 to 48 hours, preferably 12 to 32 hours, and more preferably 18 to 30 hours.

The product is concentrated under reduced pressure, the solvent is removed under vacuum, and the obtained mixture is washed with, for example, hexane to obtain a compound represented by Formula 5m.

Step (3a)

In step (3a) above, the compound represented by Formula 4 h and the compound represented by Formula 5m are reacted to obtain a compound represented by Formula 6h.

In an embodiment of the present invention, the compound represented by Formula 4 h and the compound represented by Formula 5m may be dissolved in a solvent before the reaction. Here, examples of the solvent may include, but are not particularly limited to, at least one selected from the group consisting of an aliphatic hydrocarbon solvent such as hexane or pentane, an aromatic hydrocarbon solvent such as toluene or benzene, a hydrocarbon solvent substituted with a chlorine atom such as dichloromethane, an ether-based solvent such as diethyl ether or tetrahydrofuran, acetone, and ethyl acetate. Preferably, the solvent may be diethyl ether.

The temperature at the time of mixing the compound represented by Formula 4 h and the compound represented by Formula 5m is preferably in a range of −78 °C to 30 °C. More preferably, the temperature at the time of mixing these two compounds may be −40 °C to 10 °C. Most preferably, the temperature at the time of mixing these two compounds may be about −30 °C.

After mixing the compound represented by Formula 4 h and the compound represented by Formula 5m, the resulting mixture is gradually raised to a temperature of −78 °C to 80 °C, preferably a temperature of −40 °C to 60 °C, and more preferably room temperature, and reacted under stirring for 1 to 48 hours, preferably 12 to 32 hours, and more preferably 18 to 30 hours. An excess of distilled water is then added and the mixture is stirred for about 10 minutes.

The obtained slurry is filtered and washed with a solvent such as hexane to obtain a compound represented by Formula 6h.

Step (4a)

In step (4a) above, the compound represented by Formula 6 h is reacted with an organic boron compound substituted with $R_1$ or $R_2$ to obtain a compound represented by Formula 6. Here, $R_1$ and $R_2$ are as described in the section of the transition metal compound.

In an embodiment of the present invention, $R_1$ and $R_2$ substituted in the organic boron compound may be the same or different, and are preferably the same. Specifically, $R_1$ and $R_2$ may be substituted or unsubstituted $C_{2-20}$alkenyl, substituted or unsubstituted $C_{2-20}$cycloalkenyl, or substituted or unsubstituted $C_{6-20}$aryl$C_{1-20}$ alkenyl.

The organic boron compound substituted with $R_1$ or $R_2$ may be selected from boronic acid, boronic ester, potassium trifluoroborate, alkylborane, boronic acid, and boronic ester substituted with $R_1$ or $R_2$.

In a preferred embodiment of the present invention, the organic boron compound is boronic acid substituted with $R_1$ or $R_2$, and may include, but is not limited to, at least one of isopropenyl boronic acid, vinyl boronic acid, 3-methyl-2-buten-2-yl-boronic acid, 1-phenylvinylboronic acid, cyclopenten-1-ylboronic acid, and 1-cyclohexen-1-yl-boronic acid.

In an embodiment of the present invention, a reaction of the compound represented by Formula 6 h and an organic boron compound substituted with $R_1$ or $R_2$ may be performed in the presence of basic substance such as potassium carbonate, potassium phosphate, t-butoxide potassium, sodium methoxide, sodium hydroxide, cesium carbonate, triethylamine, sodium carbonate, sodium phosphate, t-butylamine, and diisopropylethylamine, and a catalyst such as tetrakis(triphenylphosphine)palladium, palladium (II) acetate, $Na_2PdCl_4$, and tris(dibenzylideneacetone)dipalladium(0).

In an embodiment of the present invention, the reaction of step (4a) may be performed in a solvent. Here, the solvent is not particularly limited, but may be a mixed solvent of tetrahydrofuran and water.

After mixing the compounds described above in a solvent, they are reacted under stirring at a temperature of 0 °C to 120 °C, more preferably at a temperature of 25 °C to 80 °C, and most preferably at a temperature of about 70 °C for 1 to 24 hours, preferably 1 to 12 hours, and more preferably 1 to 5 hours.

After the reaction is completed, the organic layer is collected using a separatory funnel, concentrated under reduced pressure, and then dried with, for example, anhydrous sodium sulfate. Then, the product may be purified using column chromatography to obtain a compound represented by Formula 6.

Step (5)

In step (5) above, the compound represented by Formula 6 is reacted with at least one of a lithium compound, a potassium compound, and a sodium compound to obtain a compound represented by Formula 6m.

Here, at least one of a lithium compound, a potassium compound, and a sodium compound is as described in step (2a) above.

In an embodiment of the present invention, the compound represented by Formula 6 and at least one of a lithium compound, a potassium compound, and a sodium compound may be dissolved in a solvent before the reaction. Here, the solvent is as described in step (2a) above.

The temperature at which the compound represented by Formula 6 is mixed with at least one of the lithium compound, potassium compound, and sodium compound, and the reaction temperature and time after mixing them are the same as described in step (2a) above.

After the reaction is completed, the solvent is removed under vacuum, and the obtained product is washed with, for example, hexane to obtain a compound represented by Formula 6m.

Step (6)

In step (6) above, the compound represented by the Formula 6m and the compound represented by Formula 7 or a complex thereof are reacted to obtain a transition metal compound represented by Formula 1h.

In an embodiment of the present invention, the compound represented by Formula 7 may include at least one of $HfCl_4$ and $ZrCl_4$. More preferably, the compound represented by Formula 7 may be $HfCl_4$ or $ZrCl_4$. In this case, in Formula 1h above, $X_a$ may be chlorine.

In an embodiment of the present invention, the compound represented by Formula 6m and the compound represented by Formula 7 or a complex thereof may be dissolved in a solvent before the reaction. Here, examples of the solvent may include, but are not particularly limited to, at least one selected from the group consisting of an aliphatic hydrocarbon solvent such as hexane or pentane, an aromatic hydrocarbon solvent such as toluene or benzene, a hydrocarbon solvent substituted with a chlorine atom such as dichloromethane, an ether-based solvent such as diethyl ether or tetrahydrofuran, acetone, and ethyl acetate. Preferably, the solvent may be toluene.

The temperature at the time of mixing the compound represented by Formula 6m and the compound represented by Formula 7, or a complex thereof is preferably in a range of −78 °C to 30 °C. More preferably, the temperature at the time of mixing these two compounds may be −40 °C to 10 °C. Most preferably, the temperature at the time of mixing these two compounds may be about −30 °C.

After mixing the compound represented by Formula 6m and the compound represented by Formula 7 or a complex thereof, the resulting mixture is gradually raised to a temperature of −78 °C to 80 °C, preferably a temperature of −40 °C to 60 °C, and more preferably room temperature, and reacted under stirring for 1 to 96 hours, preferably 18 to 78 hours, and more preferably 24 to 72-hours.

The product is filtered through, for example, celite, and the solvent is removed under vacuum to obtain a transition metal compound represented by Formula 1h.

In an optional embodiment of the present invention, in the method for preparing a transition metal compound according to an embodiment of the present invention, the compound represented by Formula 6 may be obtained by another method.

Specifically, the method for preparing a transition metal compound according to an embodiment of the present invention may include, instead of steps (3a) and (4a), (3b) reacting the compound represented by Formula 4 h with an organic boron compound substituted with $R_1$ or $R_2$ (wherein $R_1$ and $R_2$ are as described in the section of the transition metal compound) to obtain a compound represented by the following Formula 4; and (4b) reacting the compound represented by Formula 4 with a compound represented by Formula 5m to obtain a compound represented by Formula 6:

[Formula 4]

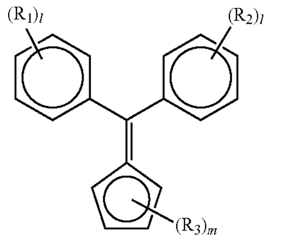

wherein l, m, and $R_1$ to $R_3$ are as described in the section of the transition metal compound.

Step (3b)

In step (3b) above, the compound represented by Formula 4 h is reacted with an organic boron compound substituted with $R_1$ or $R_2$ to obtain a compound represented by Formula 4. Here, the organic boron compound substituted with $R_1$ or $R_2$ is as described in step (4a) above. In addition, specific reaction conditions of the compound represented by Formula 4 h and the organic boron compound are substantially the same as those in step (4a) above.

Step (4b)

In step (4b) above, the compound represented by Formula 4 and the compound represented by Formula 5m are reacted to obtain a compound represented by Formula 6. Here, specific reaction conditions of the compound represented by Formula 4 and the compound represented by Formula 5m are substantially the same as those in step (3a) above.

In an optional embodiment of the present invention, in the method for preparing a transition metal compound according to an embodiment of the present invention, the compound represented by Formula 6 may be obtained by another method.

Specifically, the method for preparing a transition metal compound according to an embodiment of the present invention may include, instead of steps (1a) to (4a), (2c) reacting a compound represented by the following Formula 2 with the compound represented by Formula 3m to obtain a compound represented by Formula 4; (3c) reacting the compound represented by Formula 5 with at least one of a lithium compound, a potassium compound, and a sodium compound to obtain a compound represented by Formula 5m; and (4c) reacting the compound represented by Formula 4 with the compound represented by Formula 5m to obtain a compound represented by Formula 6:

[Formula 2]

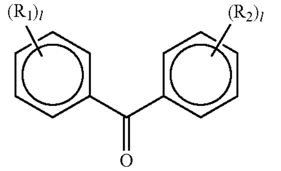

wherein l, $R_1$ and $R_2$ are as described in the section of the transition metal compound.

Step (2c)

In step (2c) above, the compound represented by Formula 2 and the compound represented by Formula 3m are reacted to obtain a compound represented by Formula 4. Here, specific reaction conditions of the compound represented by Formula 2 and the compound represented by Formula 3m are substantially the same as those in step (1a) above.

Step (3c)

In step (3c) above, the compound represented by Formula 5 is reacted with at least one of a lithium compound, a potassium compound, and a sodium compound to obtain a compound represented by the following Formula 5m. The specific conditions of step (3c) are substantially the same as those of step (2a) above.

Step (4c)

In step (4c) above, the compound represented by Formula 4 and the compound represented by Formula 5m are reacted to obtain a compound represented by Formula 6. The specific conditions of step (4c) are substantially the same as those of step (3a) above.

In an embodiment of the present invention, the method for preparing a transition metal compound may further include: (7a) reacting a compound represented by Formula 1h with a compound represented by the following Formula 8a or a compound represented by the following Formula 9 to obtain a compound represented by the following Formula 1a:

[Formula 8a]

$$X_bMgX_c$$

[Formula 9]

$$X_bLi$$

[Formula 1a]

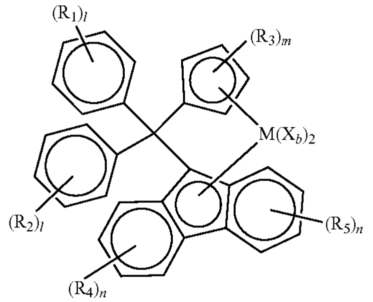

wherein l, m, n, M, and $R_1$ to $R_5$ are as described in the section of the transition metal compound, $X_b$ is each independently $C_{1-20}$alkyl, $C_{2-20}$alkenyl, $C_{2-20}$alkynyl, $C_{6-20}$aryl, $C_{1-20}$alkyl$C_{1-20}$aryl, $C_{1-20}$aryl$C_{1-20}$alkyl, $C_{1-20}$alkylamido, or $C_{6-20}$arylamido, and $X_c$ is a halogen.

In an embodiment of the present invention, the method for preparing a transition metal compound may further include: (7b) reacting the compound represented by Formula 1h with a compound represented by the following Formula 8b to obtain a compound represented by the following Formula 1b:

[Formula 8b]

$$(R_n)_3SiX_d$$

[Formula 1b]

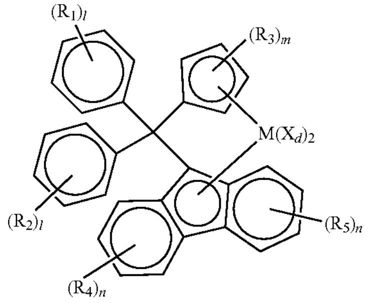

wherein l, m, n, M, and $R_1$ to $R_5$ are as described in the section of the transition metal compound, $R_n$ is each independently $C_{1-20}$alkyl, $C_{2-20}$alkenyl, $C_{2-20}$alkynyl, $C_{6-20}$aryl, $C_{1-20}$alkyl$C_{6-20}$aryl, or $C_{6-20}$aryl$C_{1-20}$alkyl, and $X_d$ is a halogen.

In an embodiment of the present invention, the compound represented by Formula 8a may be MeMgBr, and the compound represented by Formula 9 may be MeLi. In addition, the compound represented by Formula 8b may be $(Me)_3SiCl$.

In an embodiment of the present invention, the compound represented by Formula 1h and the compound represented by Formula 8a or 8b or the compound represented by Formula 9 may be dissolved in a solvent before the reaction. Here, examples of the solvent may include, but are not particularly limited to, at least one selected from the group consisting of an aliphatic hydrocarbon solvent such as hexane or pentane, an aromatic hydrocarbon solvent such as toluene or benzene, a hydrocarbon solvent substituted with a chlorine atom such as dichloromethane, an ether-based solvent such as diethyl ether or tetrahydrofuran, acetone, and ethyl acetate. Preferably, the compound represented by Formula 1h may be dissolved in toluene, and the compound represented by Formula 8a or 8b or the compound represented by Formula 9 may be dissolved in hexane.

The temperature at the time of mixing the compound represented by Formula 1h and the compound represented by Formula 8a or 8b or the compound represented by Formula 9 is preferably in the range of −78 °C to 30 °C. More preferably, the temperature at the time of mixing these two compounds may be −40 °C to 10 °C. Most preferably, the temperature at the time of mixing these two compounds may be about −30 °C.

After mixing the compound represented by Formula 1h and the compound represented by Formula 8a or 8b, or the compound represented by Formula 9, the resulting mixture is gradually raised to a temperature of −78 °C to 80 °C, preferably a temperature of −40 °C to 60 °C, and more preferably room temperature, and reacted under stirring for 1 to 48 hours, preferably 4 to 30 hours, and more preferably 6 to 24 hours.

After the reaction is completed, the solvent is removed under vacuum, dissolved in, for example, hexane, and filtered through, for example, celite. The solvent may be removed under vacuum from the obtained solution to obtain a transition metal compound represent by Formula 1a.

Olefin Polymerization Catalyst

In order to achieve another object of the present invention, an olefin polymerization catalyst comprising a transition metal compound represented by the following Formula 1; and a cocatalyst compound is provided.

[Formula 1]

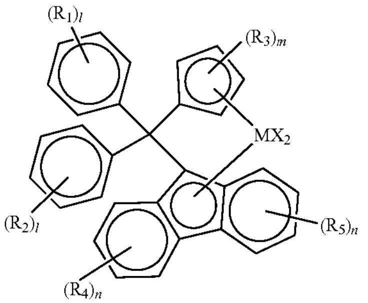

wherein l, m, n, M, X, and $R_1$ to $R_5$ are as described in the section of the transition metal compound.

In an embodiment of the present invention, in Formula 1 above, each 1 may be 1, each of m and n may be 0 or 1, M may be zirconium or hafnium, each X may be a halogen, or substituted or unsubstituted $C_{1-20}$alkyl, each of $R_1$ and $R_2$ may be substituted or unsubstituted $C_{2-20}$alkenyl, substituted or unsubstituted $C_{2-20}$cycloalkenyl, or substituted or unsubstituted $C_{6-20}$aryl$C_{1-20}$alkenyl, and each of $R_3$ to $R_5$ may be hydrogen, or substituted or unsubstituted $C_{1-20}$alkyl.

In a preferred embodiment of the present invention, the transition metal compound represented by Formula 1 is at least one of transition metal compounds represented by the following Formulas 1-1 to 1-12:

[Formula 1-1]

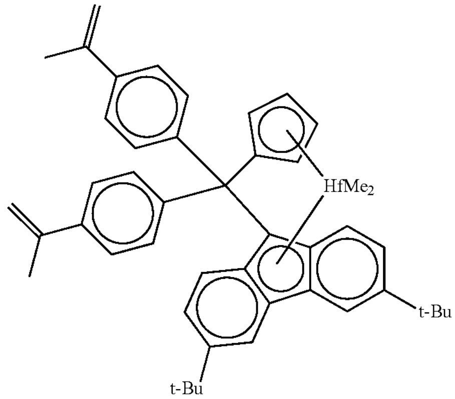

[Formula 1-2]

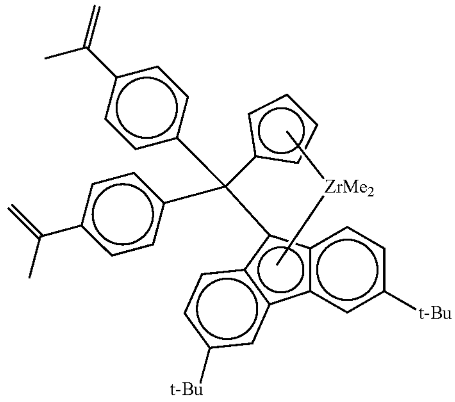

-continued

[Formula 1-3]

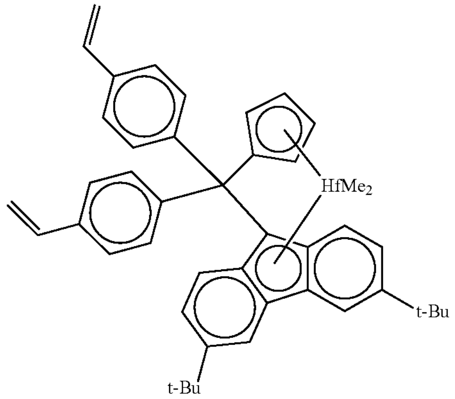

[Formula 1-4]

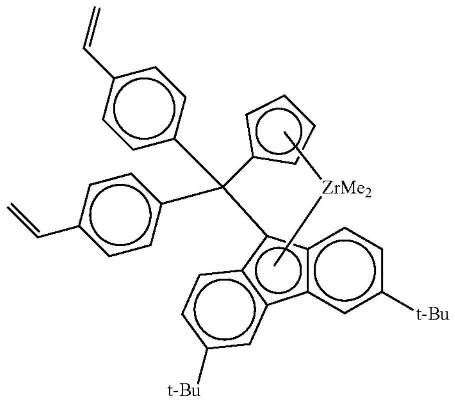

[Formula 1-5]

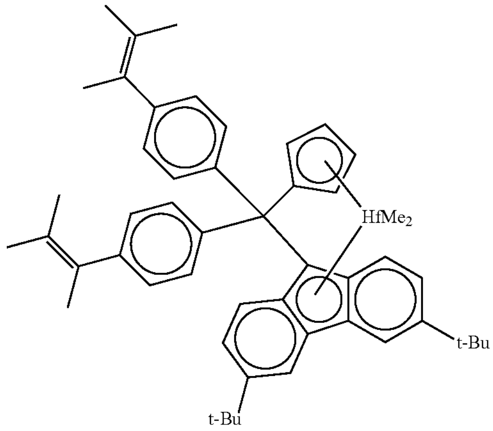

-continued
[Formula 1-6]
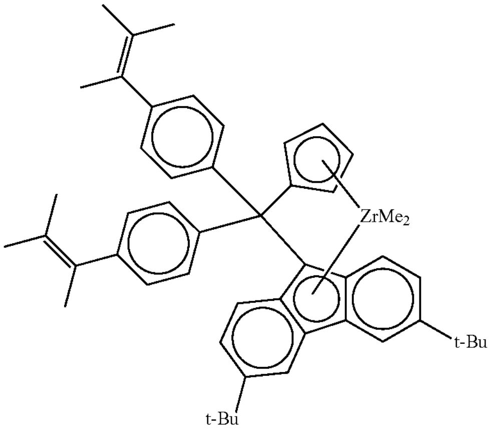
[Formula 1-7]
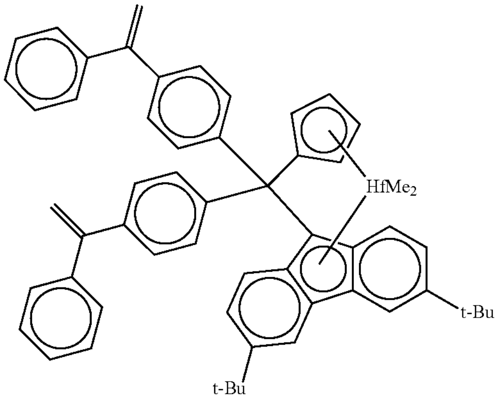
[Formula 1-8]
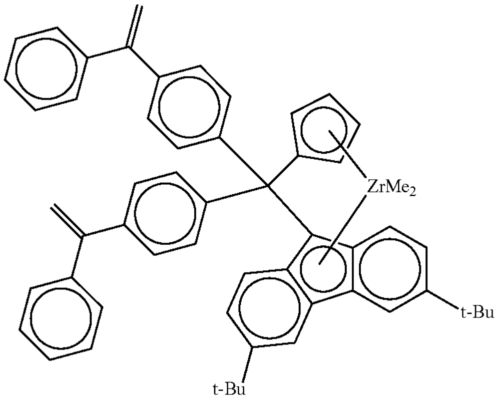
-continued
[Formula 1-9]
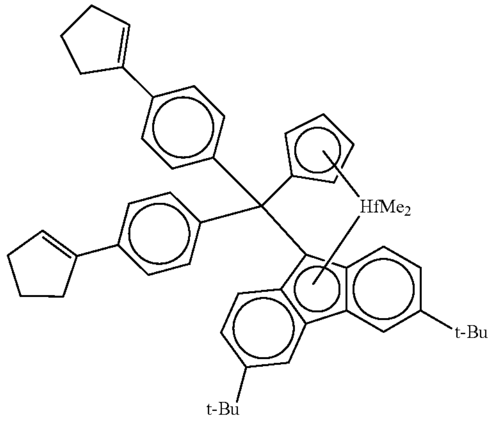
[Formula 1-10]
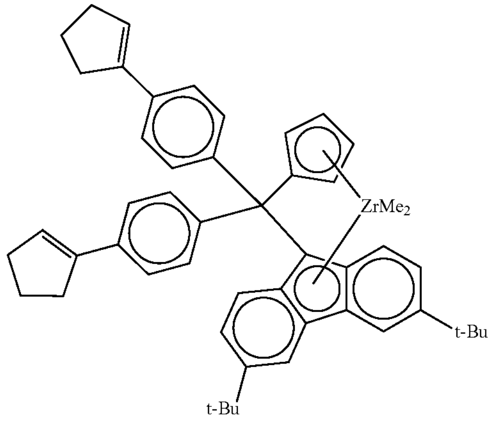
[Formula 1-11]
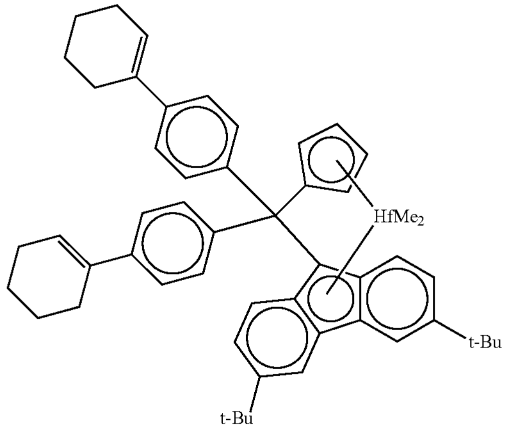

-continued

[Formula 1-12]

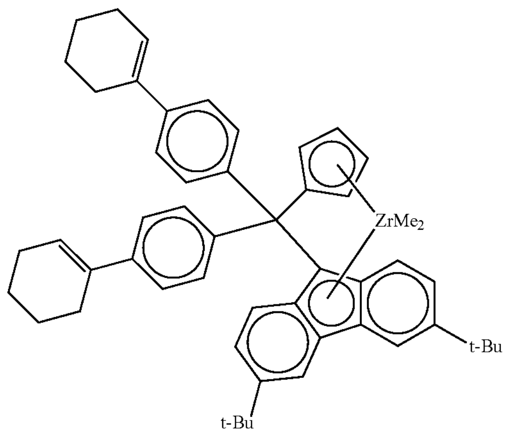

wherein Me is methyl and t-Bu is t-butyl.

Meanwhile, the cocatalyst compound may include one or more selected from the group consisting of a compound represented by the following Formula 0.10, a compound represented by the following Formula 11, and a compound represented by the following Formula 12:

[Formula 10]

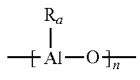

wherein n may be an integer of 2 or more, and $R_a$ may be a halogen atom, a $C_{1-20}$ hydrocarbon group, or a $C_{1-20}$ hydrocarbon group substituted with a halogen. Specifically, $R_a$ may be methyl, ethyl, or n-butyl or isobutyl.

[Formula 11]

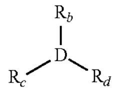

wherein D is aluminum (Al) or boron (B), and $R_b$, $R_c$, and $R_d$ are each independently a halogen atom, a $C_{1-20}$ hydrocarbon group, a $C_{1-20}$ hydrocarbon group substituted with a halogen, or a $C_{1-20}$ alkoxy group. Specifically, when D is aluminum (Al), $R_b$, $R_c$ and $R_d$ may each independently be methyl or isobutyl, and when D is boron (B), each of $R_b$, $R_c$ and $R_d$ may be pentafluorophenyl.

$[L-H]^+[Z(A)_4]^-$or $[L]^+[Z(A)_4]^-$ [Formula 12]

wherein L is a neutral or cationic Lewis base, $[L-H]^+$ and $[L]^+$ are Bronsted acids, Z is a Group 13 element, and A is each independently a substituted or unsubstituted $C_{6-20}$ aryl group, or a substituted or an unsubstituted $C_{1-20}$ alkyl group. Specifically, $[L-H]^+$ may be a dimethylanilinium cation, $[Z(A)_4]^-$ may be $[B(C_6F_5)_4]^-$, and $[L]^+$ may be $[(C_6H_5)_3C]^+$.

In an embodiment of the present invention, examples of the compound represented by Formula 10 may include, but are not limited to, methylaluminoxane, ethylaluminoxane, isobutylaluminoxane, butylaluminoxane, etc., and methylaluminoxane is preferred.

In an embodiment of the present invention, examples of the compound represented by Formula 11 may include, but are not limited to, trimethylaluminum, triethylaluminium, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexvlaluminum, trioctylaluminum, ethyldimethylaluminum, methyldiethylaluminum, triphenylaluminum, tri-p-tolylaluminum, dimethylaluminum methoxide, dimethylaluminum ethoxide, trimethylboron, triethylboron, triisobutylboron, tripropylboron, tributylboron, etc., and trimethylaluminum, triethylaluminum, and triisobutylaluminum are preferred.

In an embodiment of the present invention, examples of the compound represented by Formula 12 may include triethylammonium tetraphenylboron, tributylammonium tetraphenylboron, trimethylammonium tetraphenylboron, tripropylammonium tetraphenylboron, trimethylammonium tetra(p-tolyl)boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetrapentafluorophenylboron, N,N-diethylanilinium tetraphenylboron, N,N-diethylanilinium tetrapentafluorophenylboron, diethylammonium tetrapentafluorophenylboron, triphenylphosphonium tetraphenylboron, trimethylphosphonium tetraphenylboron, triethylammonium tetraphenylaluminum, tributylammonium tetraphenylaluminum, trimethylammonium tetraphenylaluminum, tripropylammonium tetraphenylaluminum, trimethylammonium tetra(p-tolyl)aluminum, tripropylammonium tetra(p-tolyl)aluminum, triethylammonium tetra(o,p-dimethylphenyl)aluminum, tributylammonium tetra(p-trifluoromethylphenyl)aluminum, trimethylammonium tetra (p-trifluoromethylphenyl)aluminum, tributylammonium tetrapentafluorophenylaluminum, N,N-diethylanilinium tetraphenylaluminum, N,N-diethylanilinium tetrapentafluorophenylaluminum, diethylammonium tetrapentatetraphenylaluminum, triphenylphosphonium tetraphenylaluminum, trimethylphosphonium tetraphenylaluminum, tripropylammonium tetra(p-tolyl)boron, triethylammonium tetra(o,p-dimethylphenyl)boron, tributylammonium tetra(p-trifluoromethylphenyl) boron, triphenylcarbonium tetra(p-trifluoromethylphenyl)boron, triphenylcarbonium tetrapentafluorophenylboron, etc.

In an embodiment of the present invention, the olefin polymerization catalyst may further comprise a carrier supporting a transition metal compound. Specifically, the carrier may support both the transition metal compound and the cocatalyst compound.

Here, the carrier may include a material containing a hydroxyl group on the surface, and preferably, a material having a highly reactive hydroxyl group and a siloxane group, from which moisture is removed from the surface by drying, may be used. For example, the carrier may contain at least one selected from the group consisting of silica, alumina, and magnesia. Specifically, silica, silica-alumina, and silica-magnesia dried at high temperatures may be used as carriers, and may usually contain oxide, carbonate, sulfate, and nitrate components such as $Na_2O$, $K_2CO_3$, $BaSO_4$, and $Mg(NO_3)_2$. In addition, they may contain carbon, zeolites, magnesium chloride, etc. However, the carrier is not limited thereto, and is not particularly limited as long as it can support the transition metal compound and the cocatalyst compound.

The carrier may have an average particle size of 10 to 250 μm, preferably 10 to 150 μm, and more preferably 20 to 100 μm.

The carrier may have a micropore volume of 0.1 to 10 cc/g, preferably 0.5 to 5 cc/g, and more preferably 1.0 to 3.0 cc/g.

The carrier may have a specific surface area of 1 to 1,000 $m^2/g$, preferably 100 to 800 $m^2/g$, and more preferably 200 to 600 $m^2/g$.

In a preferred embodiment, when the carrier is silica, a drying temperature of the silica may be from room temperature to 900 °C. The drying temperature may be preferably from room temperature to 800 °C, and more preferably from room temperature to 700 °C. If the drying temperature is lower than room temperature, too much moisture causes the surface moisture to react with the cocatalyst, and if the drying temperature exceeds 900 °C, the structure of the carrier may collapse.

A concentration of the hydroxy group in the dried silica may be 0.1 to 5 mmole/g, preferably 0.7 to 4 mmole/g, and more preferably 1.0 to 2 mmole/g. If the concentration of the hydroxy group is less than 0.1 mmole/g, the amount of the cocatalyst supported decreases and if the concentration of the hydroxy group exceeds 5 mmole/g, the catalyst component may be inactivated.

The total amount of the transition metal compound supported on the carrier may be 0.001 to 1 mmole based on 1 g of the carrier. If a ratio of the transition metal compound and the carrier satisfies the above range, it exhibits appropriate supported catalyst activity, which is advantageous in terms of maintaining the activity of the catalyst and economic efficiency.

The amount of the cocatalyst compound supported on the carrier may be 2 to 15 mmole based on 1 g of the carrier. If a ratio of the cocatalyst compound and the carrier satisfies the above range, it is advantageous in terms of maintaining the activity of the catalyst and economic efficiency.

One or two or more carriers may be used. For example, both the transition metal compound and the cocatalyst compound may be supported on one carrier, or the transition metal compound and the cocatalyst compound may be supported on two or more carriers, respectively. In addition, only one of the transition metal compound and the cocatalyst compound may be supported on the carrier.

Method for Preparing Olefin Polymerization Catalyst

In order to achieve another object of the present invention, provided is a method for preparing a olefin polymerization catalyst, comprising a step of supporting a transition metal compound, a cocatalyst compound, or both on a carrier according to an embodiment of the present invention.

The transition metal compound and the cocatalyst compound according to an embodiment of the present invention are as described in the section of the olefin polymerization catalyst.

In an embodiment of the present invention, as a method for supporting the transition metal compound and/or cocatalyst compound, a physical adsorption method or a chemical adsorption method may be used.

For example, the physical adsorption method may include a method in which a solution in which a transition metal compound is dissolved is brought into contact with a carrier and then dried, a method in which a solution in which a transition metal compound and a cocatalyst compound are dissolved is brought into contact with a carrier and then dried, and a method of preparing a carrier on which a transition metal compound is supported by contacting a solution in which a transition metal compound is dissolved with a carrier and then drying the solution, separately from this, contacting a solution in which a cocatalyst compound is dissolved with the carrier, and then drying the carrier to prepare a carrier on which a cocatalyst compound is supported, and then mixing them.

The chemical adsorption method may include a method in which a cocatalyst compound is first supported on the surface of a carrier and then the transition metal compound is supported on the cocatalyst compound, or a method in which a functional group on the surface of the carrier (for example, a hydroxyl group (—OH) on the surface of silica in the case of silica) and a transition metal compound are covalently bonded, etc.

Here, the solvent used for supporting the transition metal compound and/or the cocatalyst compound is not particularly limited. Examples of the solvent may include at least one selected from the group consisting of an aliphatic hydrocarbon solvent such as hexane or pentane, an aromatic hydrocarbon solvent such as toluene or benzene, a hydrocarbon solvent substituted with a chlorine atom such as dichloromethane, an ether-based solvent such as diethyl ether or tetrahydrofuran, acetone, and ethyl acetate.

In a preferred embodiment, the process for supporting the transition metal compound and/or cocatalyst compound on the carrier may be performed at a temperature of 0 to 100 °C, and preferably from room temperature to 90 °C.

In addition, the process for supporting the transition metal compound and/or cocatalyst compound on the carrier may be performed by sufficiently stirring a mixture of the transition metal compound and/or cocatalyst compound and the carrier for 1 minute to 24 hours, and preferably 5 minutes to 15 hours.

Polymerization of Olefin

An olefin-based polymer may be prepared by polymerizing an olefin-based monomer in the presence of an olefin polymerization catalyst according to an embodiment of the present invention.

Here, the olefin-based polymer may be a homopolymer of olefin-based monomers or a copolymer of olefin-based monomers and comonomers.

In an embodiment of the present invention, the olefin-based monomer is at least one selected from the group consisting of $C_{2-20}$ alpha-olefin, $C_{1-20}$ diolefin, $C_{3-20}$ cycloolefin, and $C_{3-20}$ cyclodiolefin.

For example, the olefin-based monomer may include ethylene, propylene, 1-butene, 1-pentene, 4-methyl-1-pentene, 1-hexene, 1-heptene, 1-octene, 1-decene, 1-undecene, 1-dodecene, 1-tetradecene, or 1-hexadecene, etc., and the olefin-based polymer may include a homopolymer containing only one olefin-based monomer or a copolymer containing two or more of the olefin-based monomers exemplified above.

In an exemplary embodiment, the olefin-based polymer may be a copolymer obtained by copolymerization of ethylene and $C_{3-20}$ alpha-olefin, and preferably a copolymer obtained by copolymerization of ethylene and $C_{4-8}$ alpha-olefin, but the present invention is not limited thereto.

In this case, the content of ethylene is preferably 55 to 99.9% by weight, and more preferably 90 to 99.9% by weight. The content of the alpha-olefin comonomer is preferably 0.1 to 45% by weight, and more preferably 10 to 40% by weight.

The olefin-based polymer according to an embodiment of the present invention may be polymerized by, for example, polymerization reactions such as free radical, cationic, coordination, condensation, and addition, but the present invention is not limited to thereto.

As a preferred embodiment, the olefin-based polymer may be prepared by gas phase polymerization, solution polymerization, or slurry polymerization. When the olefin-based polymer is prepared by solution polymerization or slurry polymerization, examples of solvents that may be used may include, but are not limited thereto, $C_{5-12}$ aliphatic hydrocarbon solvents such as pentane, hexane, heptane, nonane, decane, and isomers thereof; aromatic hydrocarbon solvents such as toluene and benzene; hydrocarbon solvents substituted with chlorine atoms such as dichloromethane and chlorobenzene; and mixtures thereof.

Mode For Invention

EXAMPLES

Hereinafter, the present disclosure will be described in more detail through the examples. However, the following examples are only for exemplifying the present invention, and the scope of the present invention is not limited only to these.

Example 1: Preparation of Transition Metal Compound of Formula 1-1

A transition metal compound of Formula 1-1 was prepared according to a synthesis procedure outlined in Scheme 1 below:

[Scheme 1]

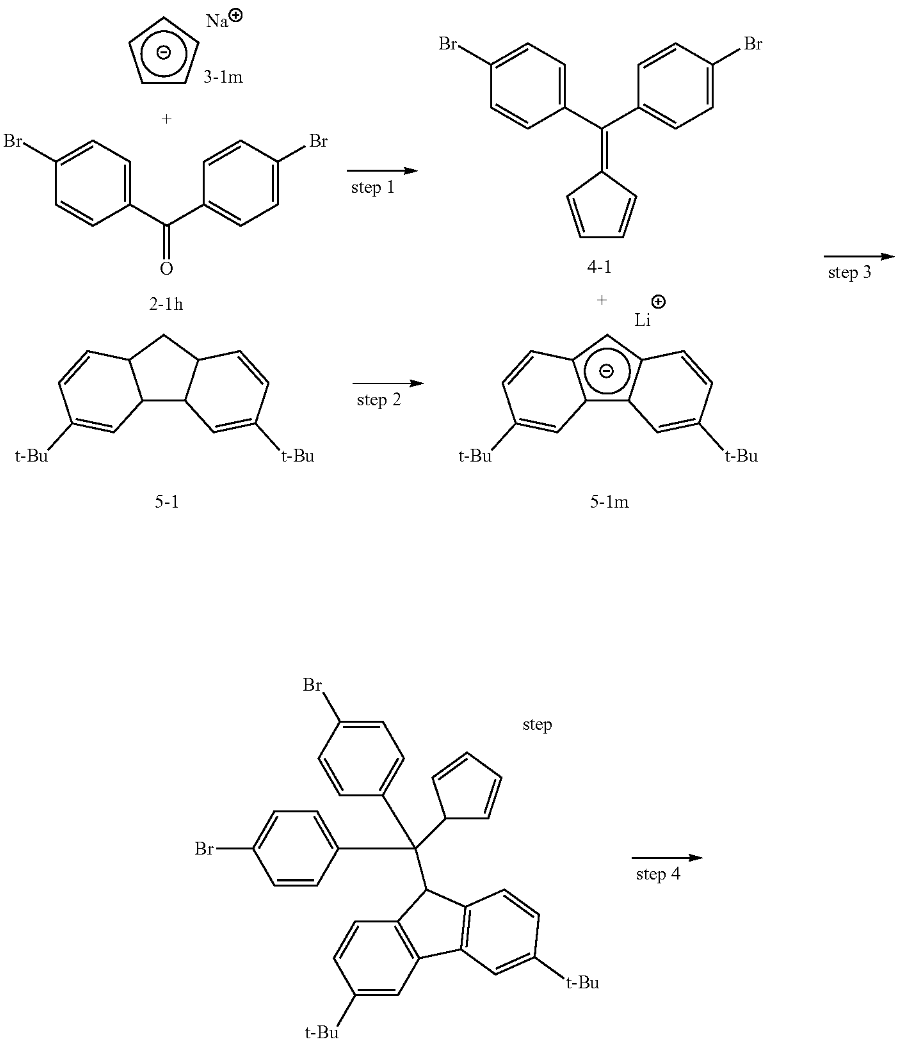

3-1m 2-1h 4-1

5-1

5-1m 6-1h

-continued
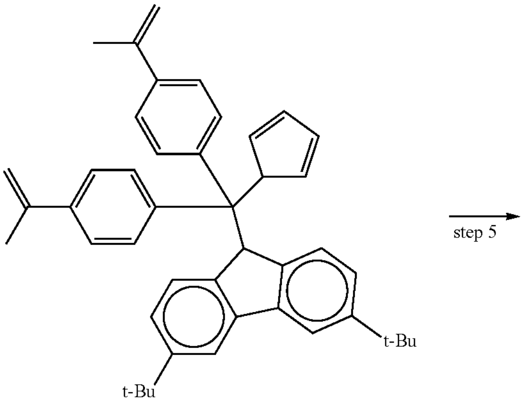
6-1
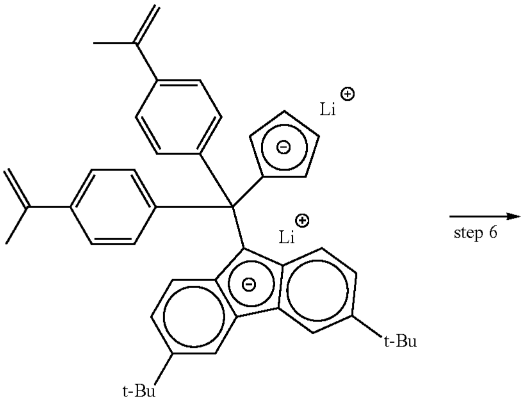
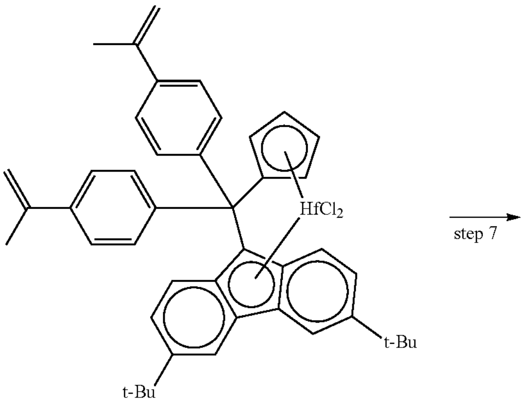
1-1h

-continued

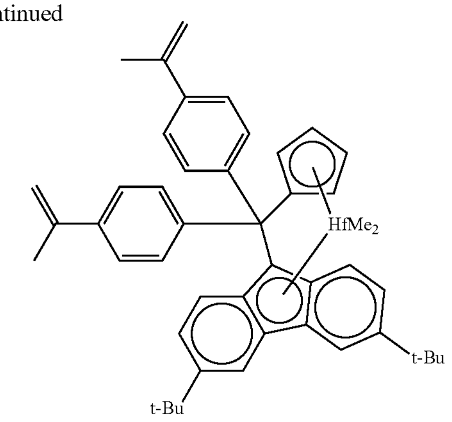

1-1

Step 1: Synthesis of 6,6-di(4-bromophenyl)fulvene (Formula 4-1)

After cooling a solution of 4,4'-dibromobenzophenone (Formula 2-1h) (10 g, 29 mmole) in tetrahydrofuran (THF) (73.5 ml) to −30 °C, a solution of sodium pentamethylcyclopentadienide (NaCp; Formula 3-1m) (2.0 M in THF, 17.6 ml) was added slowly. The temperature was gradually raised to room temperature, stirring was performed for 3 hours, and then distilled water (10 ml) was added to terminate the reaction. The product was extracted with dichloromethane, dried with anhydrous sodium sulfate, and then concentrated under reduced pressure. The product was recrystallized from dichloromethane and methanol to obtain a red crystalline solid compound (Formula 4-1) (8.7 g, yield 75%).

$^1$H NMR (300 MHz, $CDCl_3$): δ7.52 (m, 4H), 7.17 (m, 4H), 6.62 (m, 2H), 6.23 (m, 2H).

Step 2: Synthesis of 3,6-di-tert-butylfluorenyl lithium (Formula 5-1m)

After cooling a solution of 3,6-di-tert-butylfluorene (Formula 5-1) (8.4 g, 30 mmole) in hexane (55 ml) and ether (75 ml) to −30 °C, a solution of n-butyllithium (1.6 M in hexane, 20.8 ml) was slowly added. The temperature was gradually raised to room temperature and stirring was performed for 24 hours. The obtained yellow solution was concentrated under reduced pressure, the solvent was removed under vacuum, and the resulting mixture washed with hexane to obtain a yellow solid compound (Formula 5-1m) (9.6 g, yield 100%).

Step 3: Synthesis of Compound of Formula 6-1h

A solution of 3,6-di-tert-butylfluorenyl lithium (Formula 5-1m) (7.0 g, 22 mmole) in ether (30 ml) was cooled to −30 °C, and a solution of 6,6-di(4-bromophenyl)fulvene (Formula 4-1) (8.7 g, 22 mmole) in ether (120 ml) was cooled to −30 °C and added slowly. The temperature was gradually raised to room temperature, stirring was performed for 24 hours, and then an excess amount of distilled water was added and stirring was performed for 10 minutes. The obtained slurry was filtered and washed with hexane to obtain a pale yellow solid compound (Formula 6-1h) (6.2 g, yield 42%).

$^1$H NMR (300 MHz, $CDCl_3$): δ 7.60-6.95 (m, 14H), 6.55-5.30 (m, 4H), 3.09 (br s, 2H), 1.36 (s, 18H).

Step 4: Synthesis of Compound of Formula 6-1

A compound of Formula 6-1h (800 mg, 1.2 mmole), potassium carbonate (663 mg, 4.8 mmole), isopropenyl boronic acid (1.9 g, 16% by weight in THF), and tetrakis (triphenylphosphine)palladium (69 mg, 0.06 mmole) were added to THF (6 ml) and distilled water (6 ml), and then the mixture was stirred at 70 °C for 2.5 hours. The organic layer was collected using a separatory funnel, concentrated under reduced pressure, and then dried using anhydrous sodium sulfate. The product was purified using column chromatography to obtain a pale yellow solid compound (Formula 6-1) (283 mg, yield 40%).

$^1$H NMR (300 MHz, $CDCl_3$): δ7.65-7.11 (m, 14H), 6.50-5.41 (m, 6H), 5.16 (s, 2H), 3.07 (br s, 2H), 2.24 (s, 6H), 1.46 (s, 18H).

Step 5: Synthesis of Compound of Formula 6-1m

A solution of the compound of Formula 6-1 (209 mg, 0.35 mmole) in ether (3.5 ml) was cooled to −30 °C, and a solution of n-butyllithium (1.6 M in hexane, 0.47 ml) was slowly added. The temperature was gradually raised to room temperature, stirring was performed for 24 hours, hexane (3 mL) was added and then the solvent was removed under vacuum. The obtained solid compound was washed with hexane to obtain an orange solid compound (Formula 6-1m) (147 mg, yield 75%).

Step 6: Synthesis of Compound of Formula 1-1h

A solution of the compound of formula 6-1m (70 mg, 0.12 mmole) in toluene (0.8 ml) was cooled to −30 °C, and a solution of hafnium tetrachloride ($HfCl_4$) (37 mg, 0.12 mmole) in toluene (1.5 ml) was cooled to −30 °C and added slowly. The temperature was gradually raised to room temperature and stirring was performed for 24 hours. The product was filtered through celite, and the solvent was removed under vacuum to obtain a yellow solid compound (Formula 1-1h) (78 mg, yield 66%).

$^1$H NMR (300 MHz, $C_6D_6$): δ8.29 (s, 2H), 7.68 (d, 4H, J=9 Hz), 7.38-6.82 (m, 6H), 6.55 (m, 2H), 6.14 (m, 2H), 5.59 (m, 2H), 5.36 (s, 2H), 4.97 (s, 2H), 1.91 (s, 6H), 1.33 (s, 18H).

Step 7: Synthesis of Compound of Formula 1-1

A solution of a compound of Formula 1-1h (78 mg, 0.077 mmole) in toluene (1.6 ml) was cooled to −30 °C and a solution of MeMgBr (3.0 M in ether, 0.08 ml, 0.24 mmole) was slowly added. The temperature was gradually raised to room temperature and stirring was performed for 19 hours. After removing the solvent under vacuum, the mixture was filtered through celite while dissolved in hexane. The solvent was removed from the obtained solution under vacuum to obtain a yellow solid (Formula 1-1) (53.9 mg, yield 78%).

$^{1}H$ NMR (300 MHz, $C_6D_6$): δ8.36 (s, 2H), 7.86 (d, 2H, J=7.8 Hz), 7.75 (d, 2H, J=8.4 Hz), 7.47-6.68 (m, 6H), 6.46 (d, 2H, J=9.0 Hz), 6.12 (m, 2H), 5.52 (m, 2H), 5.34 (s, 2H), 4.95 (s, 2H), 1.90 (s, 6H), 1.33 (s, 18H), −1.35 (s, 6H).

Example 2: Preparation of Transition Metal Compound of Formula 1-2

A transition metal compound of Formula 1-2 was prepared according to a synthesis procedure outlined in Scheme 2 below:

[Scheme 2]

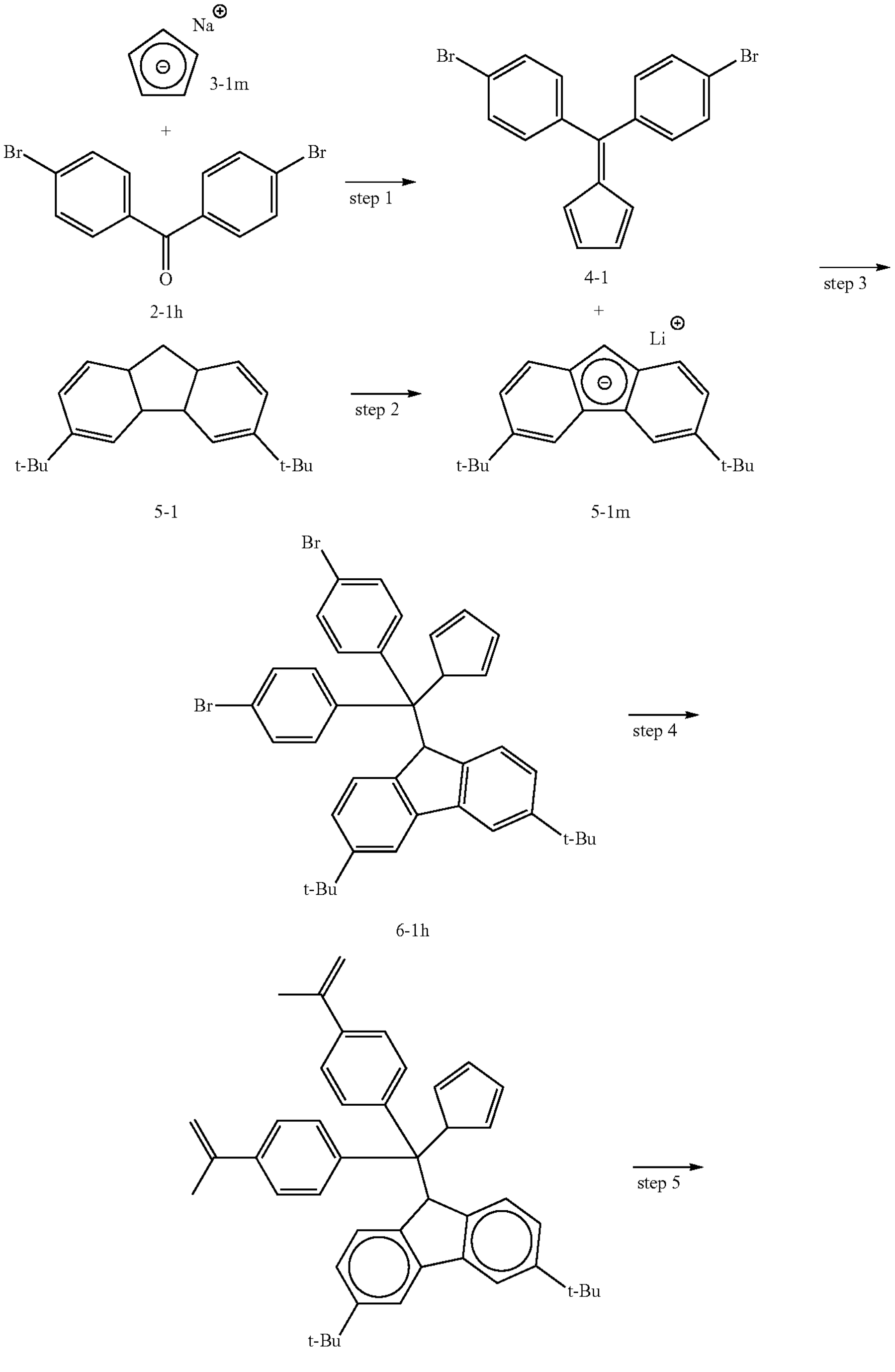

3-1m
2-1h
4-1
5-1
5-1m
6-1h
6-1

-continued

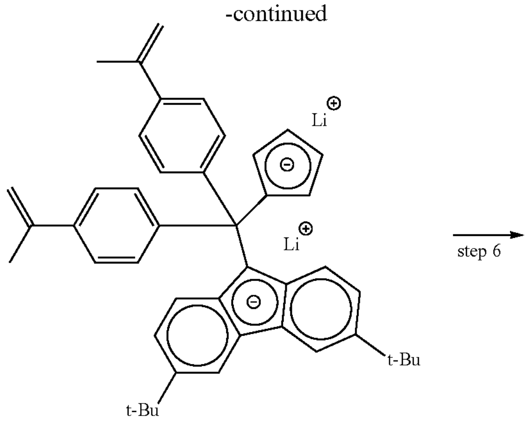

6-1m

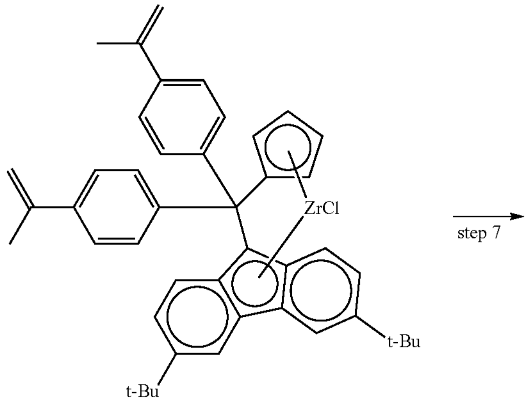

1-2h

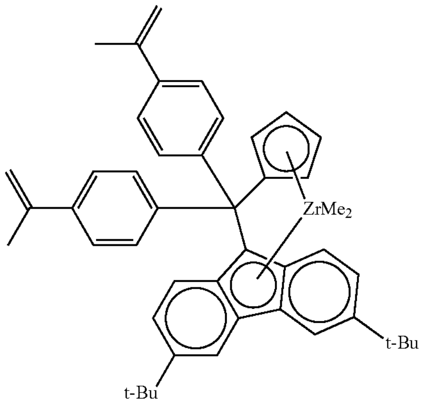

1-2

A compound represented by Formula 6-1m was obtained in the same manner as in Steps 1 to 5 of Example 1 above.

Step 6: Synthesis of Compound of Formula 1-2h

A solution of the compound of Formula 6-1m (77 mg, 0.13 mmole) in toluene (0.6 ml) was cooled to −30 °C, and a solution of zirconium tetrachloride ($ZrCl_4$) (30 mg, 0.13 mmole) in toluene (2.0 ml) was cooled to −30 °C and added thereto. The temperature was gradually raised to room temperature and stirring was performed for 70 hours. The product was filtered through celite, and the solvent was removed under vacuum to obtain a yellow solid compound (Formula 1-2h) (67 mg, yield 56%).

$^1H$ NMR (300 MHz, $C_6D_6$): δ8.31 (s, 2H), 7.66 (m, 4H), 7.83-6.84 (m, 6H), 6.50 (d, 2H, J=9 Hz), 6.19 (m, 2H), 5.62 (m, 2H), 5.34 (s, 2H), 4.96 (m, 2H), 1.90 (s, 6H), 1.31 (s, 18H).

Step 7: Synthesis of Compound of Formula 1-2

A solution of a compound of Formula 1-2h (67 mg, 0.072 mmole) in toluene (1.5 ml) was cooled to −30 °C and a solution of MeMgBr (3.0 M in ether, 0.075 ml, 0.23 mmole)

was slowly added. The temperature was gradually raised to room temperature and stirring was performed for 7 hours. After removing the solvent under vacuum, the mixture was filtered through celite while dissolved in hexane. The solvent was removed from the obtained solution under vacuum to obtain a yellow solid (Formula 1-2) (30.6 mg, yield 79%).

$^1$H NMR (300 MHz, $C_6D_6$): δ8.37 (s, 2H), 7.84 (m, 2H), 7.72 (m, 2H), 7.41-6.74 (m, 6H), 6.42 (d, 2H, J=9.3 Hz), 6.19 (m, 2H), 5.55 (m, 2H), 5.33 (s, 2H), 4.94 (m, 2H), 1.89 (s, 6H), 1.32 (s, 18H), −1.17 (s, 6H).

Example 3: Preparation of Transition Metal Compound of Formula 1-9

A transition metal compound of Formula 1-9 was prepared according to a synthesis procedure outlined in Scheme 3 below:

[Scheme 3]

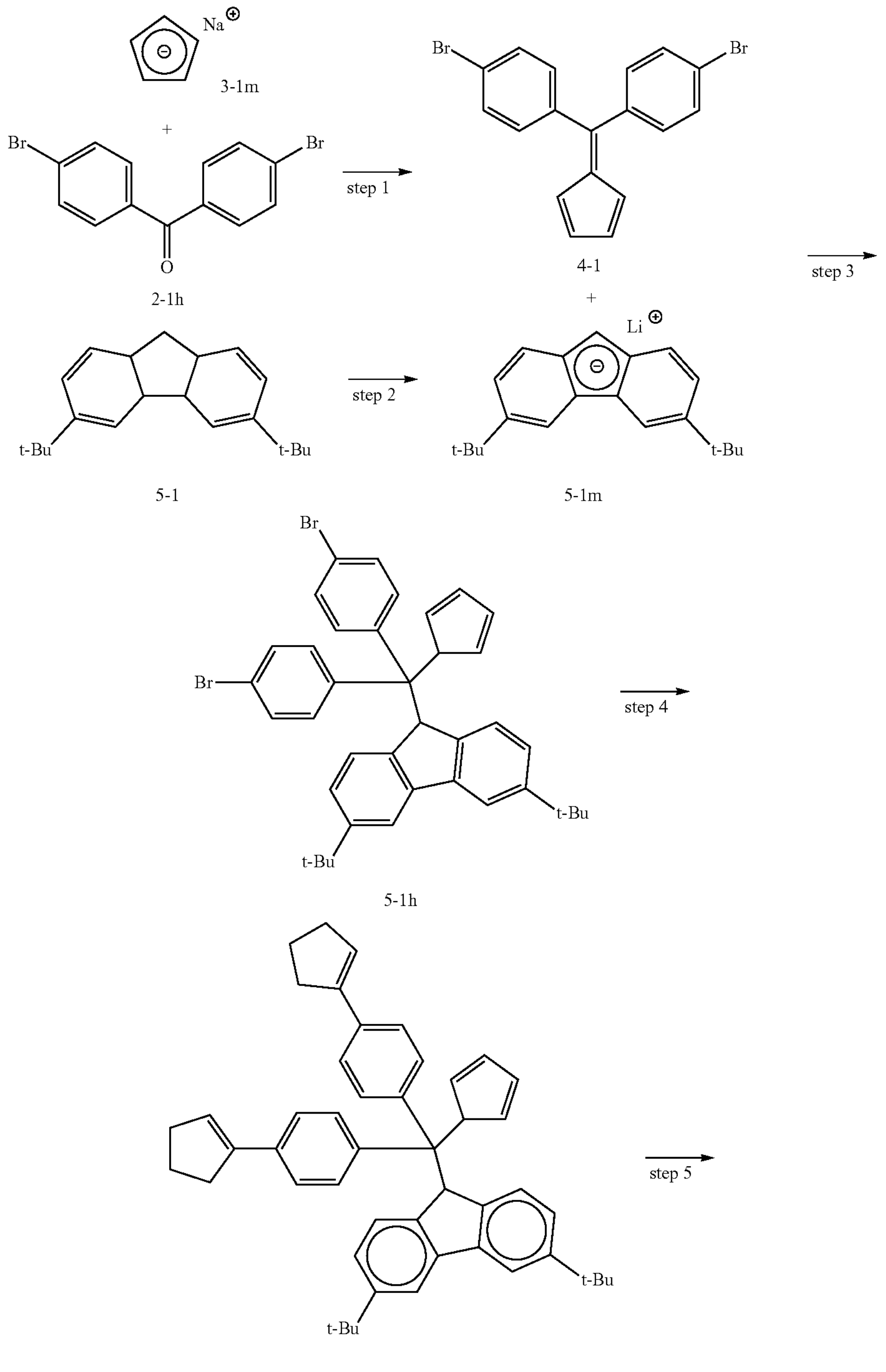

3-1m 2-1h 4-1

5-1

5-1m 5-1h 6-9

-continued

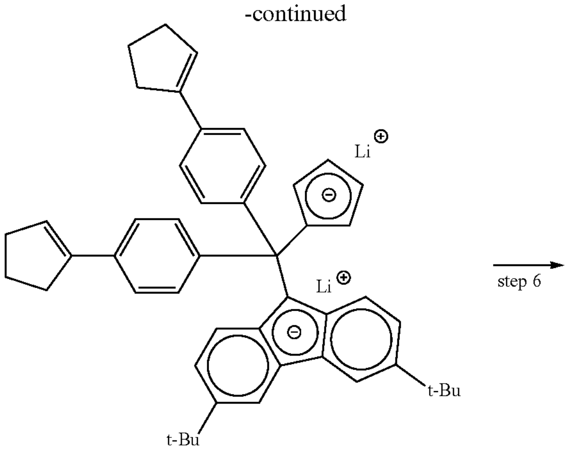

6-9m

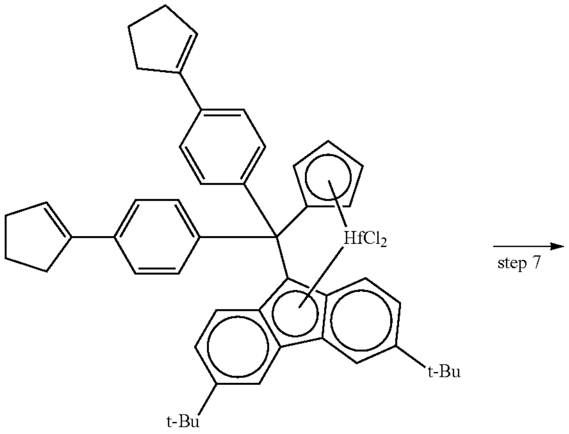

1-9h

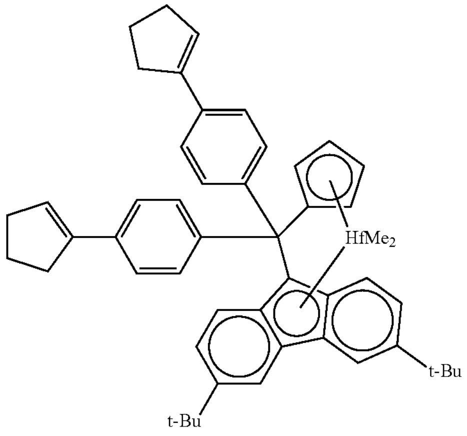

1-9

A compound represented by Formula 6-1h was obtained in the same manner as in Steps 1 to 3 of Example 1 above.

Step 4: Synthesis of Compound of Formula 6-9

A compound of Formula 6-1h (300 mg, 0.45 mmole), potassium carbonate (249 mg, 1.8 mmole), cyclopentyl boronic acid (151 mg, 1.35 mmole), and tetrakis (triphenylphosphine)palladium (26 mg, 0.023 mole) were added to THF (3 ml) and distilled water (3 ml), and then the mixture was stirred at 65 °C for 4.5 hours. The organic layer was collected using a separatory funnel, concentrated under reduced pressure, and then dried using anhydrous sodium sulfate. The product was purified using column chromatography to obtain a pale yellow solid compound (Formula 6-9) (132 mg, yield 46%).

$^1H$ NMR (300 MHz, $CDCl_3$): δ 7.85-6.96 (m, 16H), 6.11 (m, 2H), 5.45 (m, 2H), 2.65 (m, 2H), 2.49 (m, 2H), 1.98 (m, 2H), 1.30 (s, 18H).

Step 5: Synthesis of Compound of Formula 6-9m

A solution of the compound of Formula 6-9 (70 mg, 0.11 mmole) in ether (2.5 ml) was cooled to −30 °C, and a solution of n-butyllithium solution (1.6 M in hexane, 0.16 ml) was slowly added. The temperature was gradually raised to room temperature and stirring was performed for 24 hours to obtain an orange solution (6-9 m).

Step 6: Synthesis of Compound of Formula 1-9h

A solution of Formula 6-9m obtained in step 5 was cooled to −30 °C and hafnium tetrachloride ($HfCl_4$) (35 mg, 0.11 mmole) was added. The temperature was gradually raised to room temperature, stirring was performed for 16 hours, and then the solvent was removed under vacuum. A solution of the obtained solid compound in toluene was filtered through celite, and the solvent was removed under vacuum to obtain a yellow solid compound (Formula 1-9h) (84 mg, yield 87%).

$^1H$ NMR (300 MHz, $C_6D_6$): δ 8.32 (m, 2H), 7.73 (m, 2H), 7.42-7.32 (m, 2H), 7.20-6.88 (m, 6H), 6.55 (d, J=9.3 Hz, 2H), 6.17 (m, 2H), 6.05 (m, 2H), 5.64 (t, J=2.7 Hz, 2H), 2.55 (m, 4H), 2.35 (m, 4H), 1.83 (m, 4H), 1.37 (s, 18H).

Step 7: Synthesis of Compound of Formula 1-9

A solution of a compound of Formula 1-9h (84 mg, 0.095 mmole) in toluene (1.8 ml) was cooled to −30 °C and a solution of MeMgBr (3.0 M in ether, 0.10 ml, 0.30 mmole) was slowly added. The temperature was gradually raised to room temperature and stirring was performed for 4 hours. After removing the solvent under vacuum, the mixture was filtered through celite while dissolved in toluene. The solvent was removed from the obtained solution under vacuum to obtain a yellow solid (Formula 1-9) (73.8 mg, yield 92%).

$^1H$ NMR (300 MHz, $C_6D_6$): δ 8.39 (m, 2H), 7.91 (m, 2H), 7.79 (m, 2H), 7.45-6.77 (m, 6H), 6.56 (d, J=9.3 Hz, 2H), 6.15 (s, 2H), 6.02 (s, 2H), 5.57 (s, 2H), 2.52 (m, 4H), 2.35 (m, 4H), 1.82 (m, 4H), 1.36 (s, 18H), −1.33 (s, 6H).

Example 4: Preparation of Transition Metal Compound of Formula 1-10

A transition metal compound of Formula 1-10 was prepared according to a synthesis procedure outlined in Scheme 4 below:

[Scheme 4]

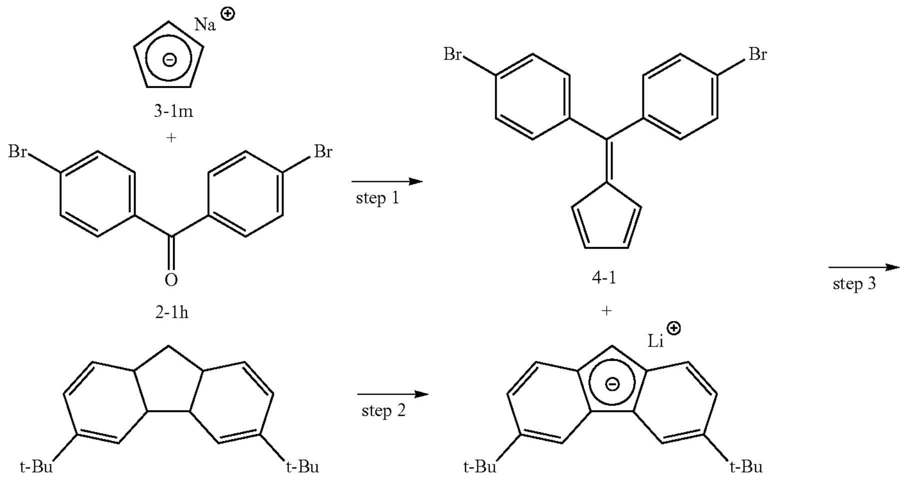

3-1m 2-1h 5-1

4-1

5-1m

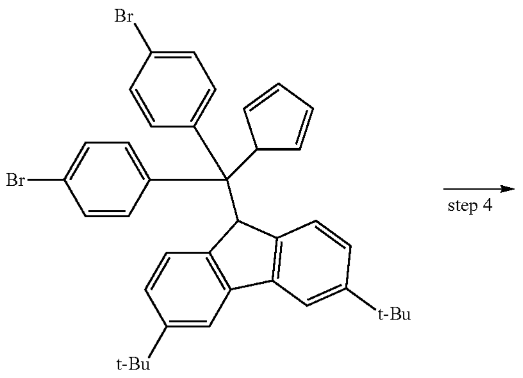

5-1h

-continued
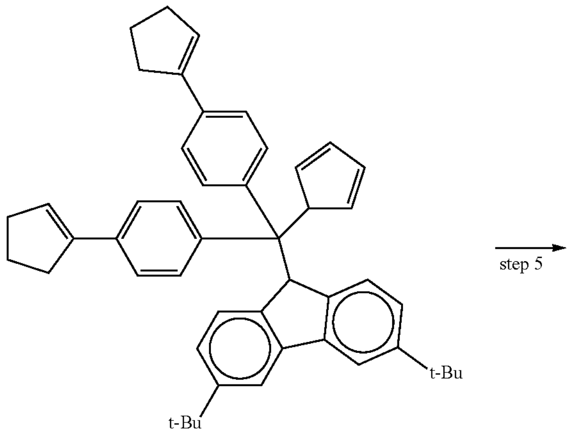
6-9
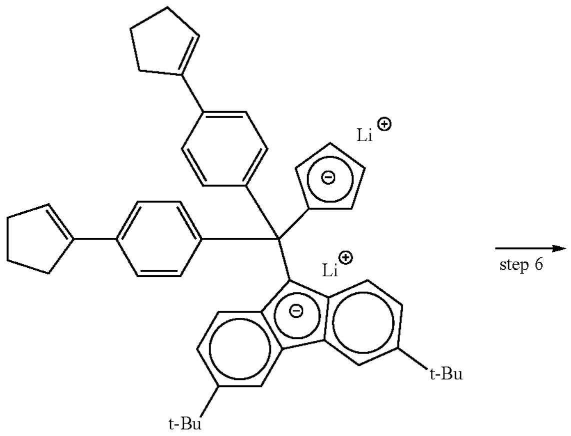
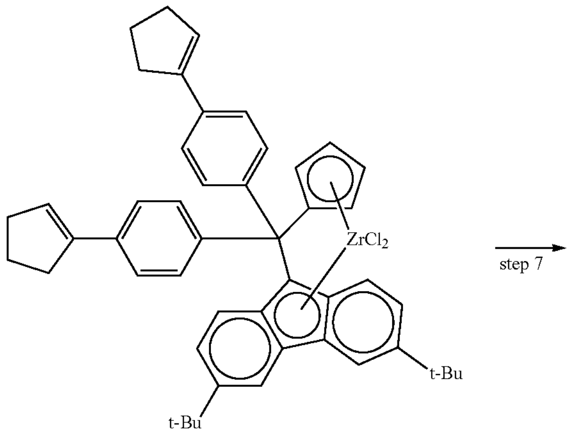
1-10h

-continued

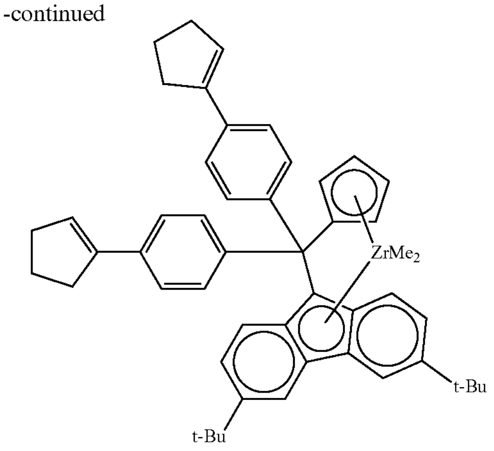

1-10

A compound represented by Formula 6-9 was obtained in the same manner as in Steps 1 to 4 of Example 3 above.

Step 5: Synthesis of Compound of Formula 6-9m

A solution of the compound of Formula 6-9 (60 mg, 0.093 mmole) in ether (2.3 ml) was cooled to −30 °C, and a solution of n-butyllithium solution (1.6 M in hexane, 0.13 ml) was slowly added. The temperature was gradually raised to room temperature and the stirring was performed for 24 hours to obtain an orange solution (6-9 m).

Step 6: Synthesis of Compound of Formula 1-10h

A solution of Formula 6-9m obtained in step 5 was cooled to −30 °C and zirconium tetrachloride ($ZrCl_4$) (22 mg, 0.093 mmole) was added. The temperature was gradually raised to room temperature, stirring was performed for 5.5 hours, and then the solvent was removed under vacuum. A solution of the obtained solid compound in toluene was filtered through celite, and the solvent was removed under vacuum to obtain a yellow solid compound (Formula 1-10h) (83 mg, yield 99%).

$^1$H NMR (300 MHz, $C_6D_6$): δ 8.34 (m, 2H), 7.72 (m, 2H), 7.38 (m, 2H), 7.29 (m, 2H), 7.34-6.91 (m, 4H), 6.58 (d, J=9.3 Hz, 2H), 6.23 (t, J=2.7 Hz, 2H), 6.05 (m, 2H), 5.68 (t, J=2.7 Hz, 2H), 2.55 (m, 4H), 2.36 (m, 4H), 1.83 (m, 4H), 1.37 (s, 18H).

Step 7: Synthesis of Compound of Formula 1-10

A solution of a compound of Formula 1-10h (83 mg, 0.093 mmole) in ether (1.5 ml) was cooled to −30 °C and a solution of MeMgBr (3.0 M in ether, 0.10 ml, 0.30 mmole) was slowly added. The temperature was gradually raised to room temperature and stirring was performed for 14 hours. After removing the solvent under vacuum, the mixture was dissolved in a 1:1 mixed solution of toluene and hexane and filtered through celite. The solvent was removed from the obtained solution under vacuum to obtain a yellow solid (Formula 1-10) (67.6 mg, yield 95%).

$^1$H NMR (300 MHz, $C_6D_6$): δ 8.41 (m, 2H), 7.91 (m, 2H), 7.78 (m, 2H), 7.64-6.83 (m, 6H), 6.53 (m, 2H), 6.23 (m, 2H), 6.03 (m, 2H), 5.62 (m, 2H), 2.55 (m, 4H), 2.36 (m, 4H), 1.82 (m, 4H), 1.36 (s, 18H), −1.13 (s, 6H).

INDUSTRIAL APPLICABILITY

Since the transition metal compound and the olefin polymerization catalyst comprising the same according to an embodiment of the present invention have a unique three-dimensional structure, it is possible to control the physical properties of the polymer.

The invention claimed is:

1. A transition metal compound represented by the following Formula 1:

[Formula 1]

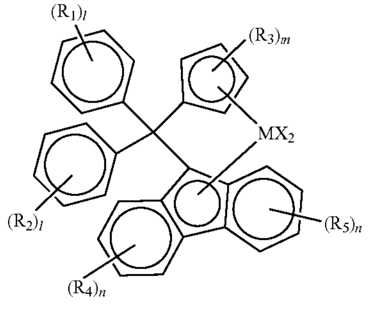

wherein l is each independently an integer from 0 to 5, provided that at least one is not 0, and m and n are each independently an integer from 0 to 4, M is titanium (Ti), zirconium (Zr), or hafnium (Hf), X is each independently a halogen, nitro, $C_{1-20}$alkyl, $C_{2-20}$alkenyl, $C_{2-20}$alkynyl, $C_{6-20}$aryl, $C_{1-20}$alkyl$C_{6-20}$ aryl, $C_{6-20}$aryl$C_{1-20}$alkyl, $C_{1-20}$alkylamido, $C_{6-20}$arylamido, $C_{1-20}$sulfonate, or $C_{1-20}$sulfonamide, at least one of $R_1$ and $R_2$ is an alkenyl group selected from substituted or unsubstituted $C_{2-20}$alkenyl, substituted or unsubstituted $C_{2-20}$cycloalkenyl, substituted or unsubstituted $C_{1-20}$alkenyl$C_{6-20}$aryl, substituted or unsubstituted $C_{6-20}$aryl$C_{1-20}$alkenyl, substituted or unsubstituted $C_{1-20}$cycloalkenyl$C_{6-20}$aryl, and substituted or unsubstituted $C_{6-20}$aryl$C_{1-20}$cycloalkenyl, provided that when only one of $R_1$ and $R_2$ is an alkenyl group, the other of $R_1$ and $R_2$ may be hydrogen, substituted or unsubstituted $C_{1-20}$alkyl, substituted or unsubstituted $C_{6-20}$aryl, substituted or unsubstituted $C_{1-20}$alkyl$C_{6-}$ $_{20}$aryl, substituted or unsubstituted $C_{6-20}$aryl$C_{1-20}$alkyl, substituted or unsubstituted $C_{1-20}$heteroalkyl, substituted or unsubstituted $C_{3-20}$heteroaryl, substituted or unsubstituted $C_{1-20}$alkylamido, substituted or unsubstituted $C_{6-20}$arylamido, substituted or unsubstituted $C_{1-20}$alkylidene, or substituted or unsubstituted $C_{1-20}$silyl, and $R_3$ to $R_5$ are each independently hydrogen, substituted or unsubstituted $C_{1-20}$alkyl, substituted or unsubstituted $C_{6-20}$aryl, substituted or unsubstituted $C_{1-20}$alkyl$C_{6-20}$ aryl, substituted or unsubstituted $C_{6-20}$aryl$C_{1-20}$alkyl, substituted or unsubstituted $C_{1-20}$heteroalkyl, substituted or unsubstituted $C_{3-20}$heteroaryl, substituted or unsubstituted $C_{1-20}$alkylamido, substituted or unsubstituted $C_{6-20}$arylamido, substituted or unsubstituted $C_{1-20}$alkylidene, or substituted or unsubstituted $C_{1-20}$silyl, provided that $R_3$ to $R_5$ may each independently connect adjacent groups to form a substituted or unsubstituted, saturated or unsaturated $C_{4-20}$ ring.

2. The transition metal compound of claim 1, wherein each l is 1, each of m and n is 0 or 1, M is zirconium or hafnium, each X is a halogen, or substituted or unsubstituted $C_{1-20}$alkyl, each of $R_1$ and $R_2$ is substituted or unsubstituted $C_{2-20}$alkenyl, substituted or unsubstituted $C_{2-20}$cycloalkenyl, or substituted or unsubstituted $C_{6-20}$aryl$C_{1-20}$alkenyl, and each of $R_3$ to $R_5$ is a hydrogen, or substituted or unsubstituted $C_{1-20}$alkyl.

3. The transition metal compound of claim 2, wherein the transition metal compound represented by Formula 1 is at least one of transition metal compounds represented by the following Formulas 1-1 to 1-12:

[Formula 1-1]

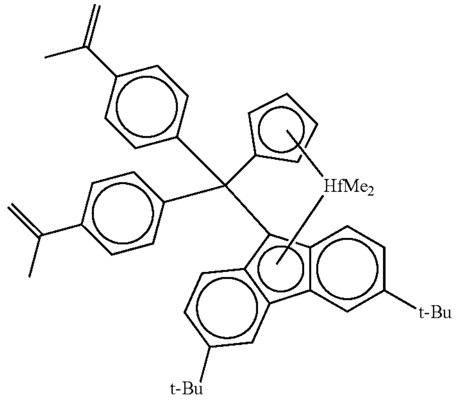

[Formula 1-2]

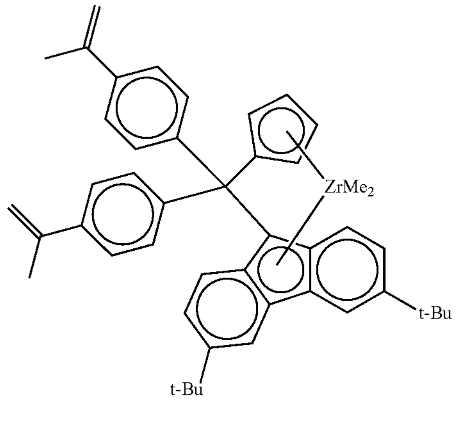

-continued

[Formula 1-3]

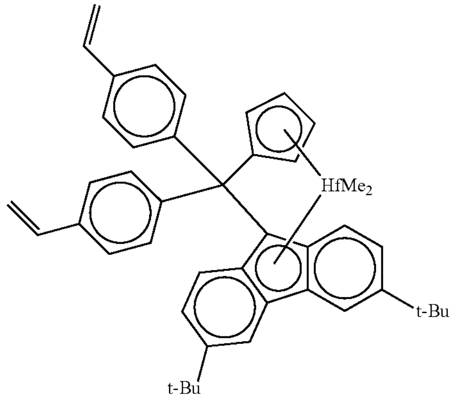

[Formula 1-4]

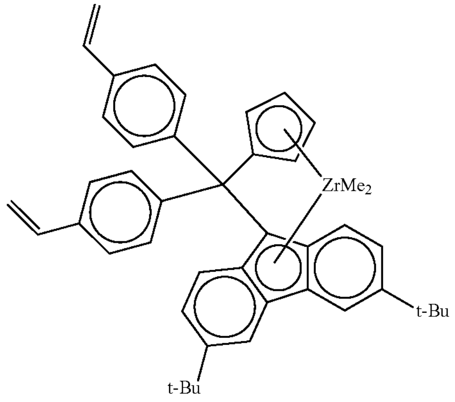

[Formula 1-5]

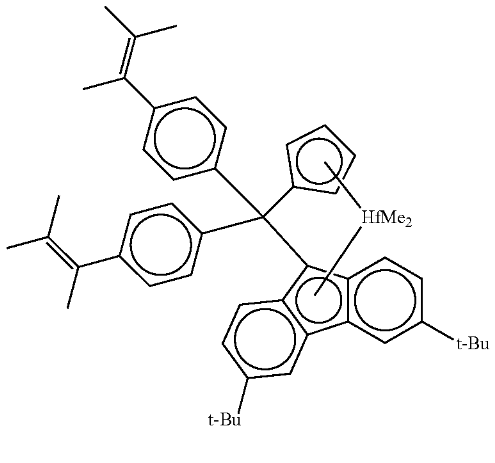

-continued
[Formula 1-6]
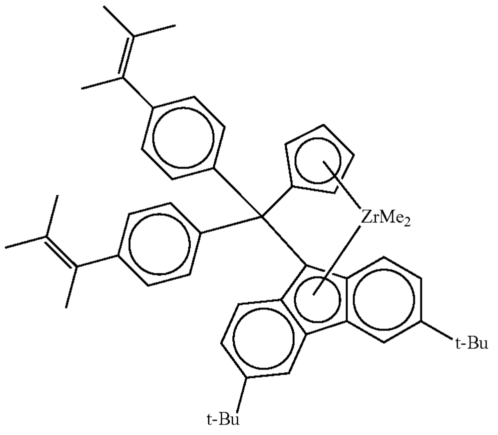
[Formula 1-7]
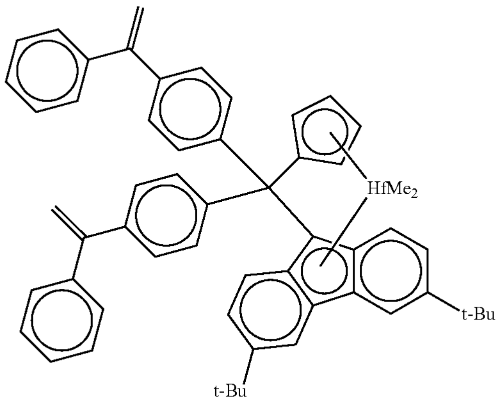
[Formula 1-8]
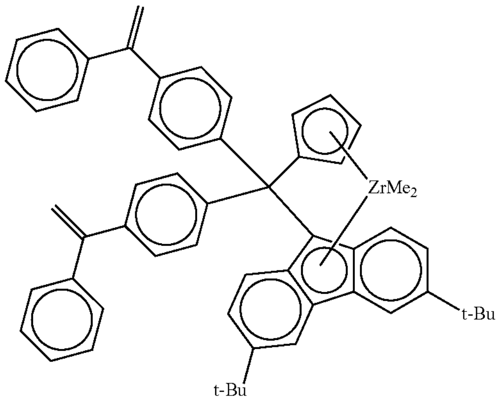
-continued
[Formula 1-9]
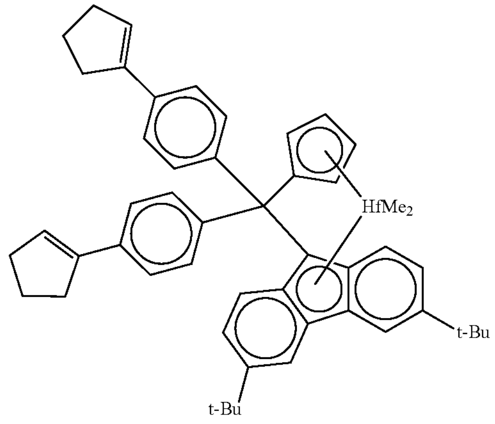
[Formula 1-10]
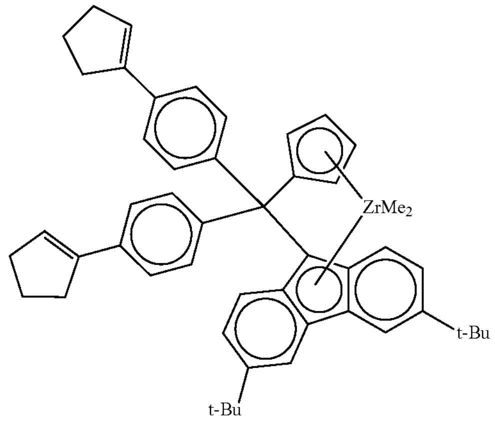
[Formula 1-11]
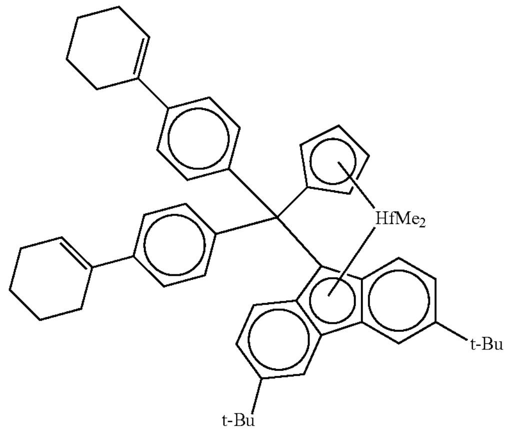

-continued

[Formula 1-12]

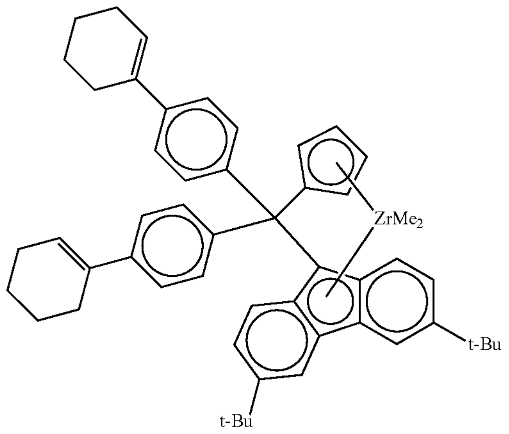

wherein Me is methyl and t-Bu is t-butyl.

4. A method for preparing the transition metal compound of claim 1, the method comprising:

(1a) reacting a compound represented by the following Formula 2h with a compound represented by the following Formula 3m to obtain a compound represented by the following Formula 4h; (2a) reacting a compound represented by the following Formula 5 with at least one of a lithium compound, a potassium compound, and a sodium compound to obtain a compound represented by the following Formula 5m; (3a) reacting a compound represented by the following Formula 4 h with a compound represented by the following Formula 5m to obtain a compound represented by the following Formula 6h; (4a) reacting the compound represented by the following Formula 6 h with an organic boron compound substituted with $R_1$ or $R_2$ (where $R_1$ and $R_2$ are as described in claim 1) to obtain a compound represented by the following Formula 6; (5) reacting the compound represented by the following Formula 6 with at least one of a lithium compound, a potassium compound, and a sodium compound to obtain a compound represented by the following Formula 6m; and (6) reacting a compound represented by the following Formula 6m with a compound represented by the following Formula 7 or a complex thereof to obtain a transition metal compound represented by the following Formula 1h:

[Formula 2h]

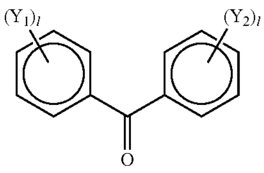

[Formula 3m]

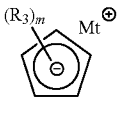

-continued

[Formula 4h]

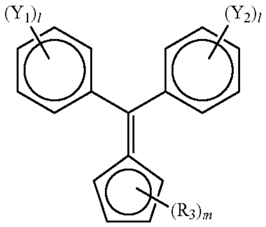

[Formula 5]

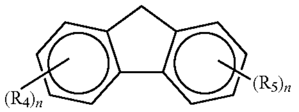

[Formula 5m]

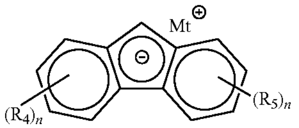

[Formula 6h]

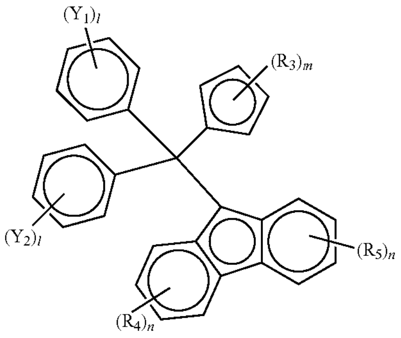

[Formula 6]

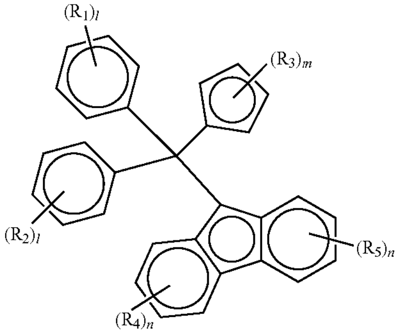

[Formula 6m]

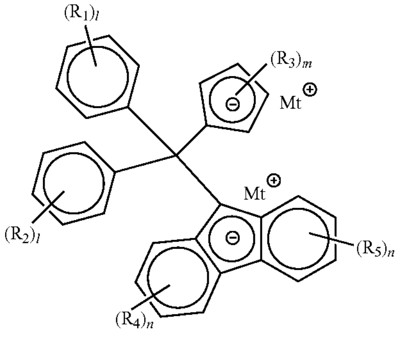

[Formula 7]

$M(X_a)_4$

-continued

[Formula 1h]

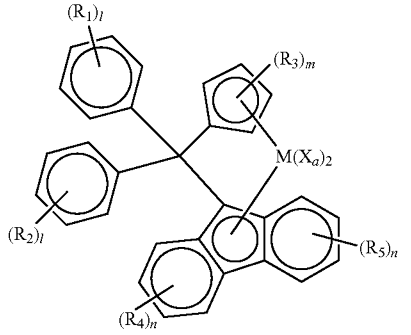

wherein l, m, n, M, and $R_1$ to $R_5$ are as described in claim 1, Mt is one of lithium, potassium and sodium, $Y_1$ and $Y_2$ are each a halogen, $C_{1-20}$sulfonate, or $C_{1-20}$sulfonamide, provided that either $Y_1$ or $Y_2$ may be $R_1$ or $R_2$, and $X_a$ is a halogen, $C_{1-20}$sulfonate, $C_{1-20}$sulfonamide, $C_{6-20}$aryl$C_{1-20}$alkyl, or $C_{1-20}$alkylamido, or, wherein the method includes, instead of steps (3a) and (4a), (3b) reacting the compound represented by Formula 4 h with an organic boron compound substituted with $R_1$ or $R_2$ (wherein $R_1$ and $R_2$ are as described in claim 1) to obtain a compound represented by the following Formula 4; and (4b) reacting the compound represented by Formula 4 with a compound represented by Formula 5m to obtain a compound represented by Formula 6:

[Formula 4]

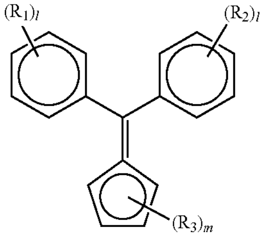

wherein l, m, and $R_1$ to $R_3$ are as described in claim 1, or, wherein the method includes, instead of steps (1a) to (4a), (2c) reacting a compound represented by the following Formula 2 with the compound represented by Formula 3m to obtain a compound represented by Formula 4; (3c) reacting the compound represented by Formula 5 with at least one of a lithium compound, a potassium compound, and a sodium compound to obtain a compound represented by Formula 5m; and (4c) reacting the compound represented by Formula 4 with the compound represented by Formula 5m to obtain a compound represented by Formula 6:

[Formula 2]

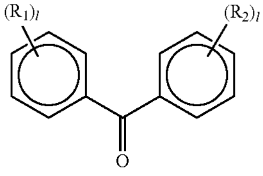

wherein l, $R_1$ and $R_2$ are as described in claim 1.

5. The method of claim 4, wherein an organic boron compound substituted with $R_1$ or $R_2$ (wherein $R_1$ and $R_2$ are as described in claim 1) is selected from boronic acid, boronic ester, potassium trifluoroborate, alkylborane, boronic acid, and boronic ester substituted with $R_1$ or $R_2$.

6. The method of claim 4, wherein the compound represented by Formula 7 is $HfCl_4$ or $ZrCl_4$.

7. The method of claim 4, further comprising: (7a) reacting a compound represented by Formula 1h with a compound represented by the following Formula 8a or a compound represented by the following Formula 9 to obtain a compound represented by the following Formula 1a:

[Formula 8a]

$X_bMgX_c$

[Formula 9]

$X_bLi$

[Formula 1a]

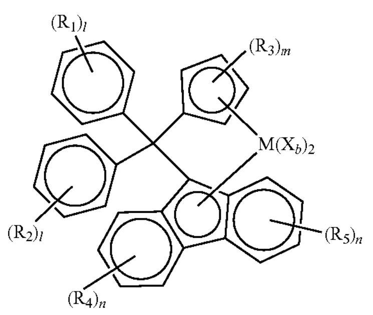

wherein l, m, n, M, and $R_1$ to $R_5$ are as described in claim 1, $X_b$ is each independently $C_{1-20}$alkyl, $C_{2-20}$alkenyl, $C_{2-20}$alkynyl, $C_{6-20}$aryl, $C_{1-20}$alkyl$C_{6-20}$aryl, $C_{6-20}$aryl$C_{1-20}$alkyl, $C_{1-20}$alkylamido, or $C_{6-20}$arylamido, and $X_c$ is a halogen.

8. The method of claim 4, further comprising: (7b) reacting the compound represented by Formula 1h with a compound represented by the following Formula 8b to obtain a compound represented by the following Formula 1b:

[Formula 8b]

$(R_n)_3SiX_d$

[Formula 1b]

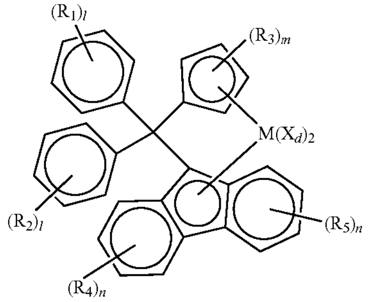

wherein l, m, n, M, and $R_1$ to $R_5$ are as described in claim 1, $R_n$ is each independently $C_{1-20}$alkyl, $C_{2-20}$alkenyl, $C_{2-20}$alkynyl, $C_{6-20}$aryl, $C_{1-20}$alkyl$C_{6-20}$aryl, or $C_{6-20}$aryl$C_{1-20}$alkyl, and $X_d$ is a halogen.

9. The method of claim 7, wherein the compound represented by Formula 8a is MeMgBr, and the compound represented by Formula 9 is MeLi.

10. The method of claim 8, wherein the compound represented by Formula 8b is $(Me)_3SiCl$.

11. An olefin polymerization catalyst, comprising the transition metal compound of claim 1; and a cocatalyst compound.

12. The olefin polymerization catalyst of claim 11, wherein the cocatalyst compound is one or more selected from the group consisting of a compound represented by the following Formula 10, a compound represented by the following Formula 11, and a compound represented by the following Formula 12:

[Formula 10]

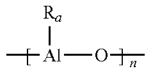

[Formula 11]

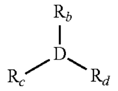

[Formula 12]

$[L—H]^+[Z(A)_4]^-$ or $[L]^+[Z(A)_4]^-$ wherein n is an integer of 2 or more, and $R_a$ is a halogen atom, a $C_{1-20}$ hydrocarbon group, or a $C_{1-20}$ hydrocarbon group substituted with a halogen, D is aluminum (Al) or boron (B), and $R_b$, $R_c$, and $R_d$ are each independently a halogen atom, a $C_{1-20}$ hydrocarbon group, a $C_{1-20}$ hydrocarbon group substituted with a halogen, or a $C_{1-20}$ alkoxy group, and L is a neutral or cationic Lewis base, $[L\text{-}H]^+$ and $[L]^+$ are Bronsted acids, Z is a Group 13 element, and A is each independently a substituted or unsubstituted $C_{6-20}$ aryl group, or a substituted or an unsubstituted $C_{1-20}$ alkyl group.

13. The olefin polymerization catalyst of claim 12, wherein the compound represented by Formula 10 is at least one selected from the group consisting of methyl aluminoxane, ethyl aluminoxane, isobutyl aluminoxane, and butyl aluminoxane.

14. The olefin polymerization catalyst of claim 12, wherein the compound represented by Formula 11 is at least one selected from the group consisting of trimethylaluminum, triethylaluminium, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminum methoxide, dimethylaluminum ethoxide, trimethylboron, triethylboron, triisobutylboron, tripropylboron, and tributylboron.

15. The olefin polymerization catalyst of claim 12, wherein the compound represented by Formula 12 is at least one selected from the group consisting of triethylammonium tetraphenylboron, tributylammonium tetraphenylboron, trimethylammonium tetraphenylboron, tripropylammonium tetraphenylboron, trimethylammonium tetra(p-tolyl)boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetrapentafluorophenylboron, N,N-diethylanilinium tetraphenylboron, N,N-diethylanilinium tetrapentafluorophenylboron, diethylammonium tetrapentafluorophenylboron, triphenylphosphonium tetraphenylboron, trimethylphosphonium tetraphenylboron, triethylammonium tetraphenylaluminum, tributylammonium tetraphenylaluminum, trimethylammonium tetraphenylaluminum, tripropylammonium tetraphenylaluminum, trimethylammonium tetra(p-tolyl)aluminum, tripropylammonium tetra(p-tolyl)aluminum, triethylammonium tetra(o,p-dimethylphenyl)aluminum, tributylammonium tetra(p-trifluoromethylphenyl)aluminum, trimethylammonium tetra (p-trifluoromethylphenyl)aluminum, tributylammonium tetrapentafluorophenylaluminum, N,N-diethylanilinium tetraphenylaluminum, N,N-diethylanilinium tetrapentafluorophenylaluminum, diethylammonium tetrapentatetraphenylaluminum, triphenylphosphonium tetraphenylaluminum, trimethylphosphonium tetraphenylaluminum, tripropylammonium tetra(p-tolyl)boron, triethylammonium tetra(o,p-dimethylphenyl)boron, tributylammonium tetra(p-trifluoromethylphenyl)boron, triphenylcarbonium tetra(p-trifluoromethylphenyl)boron, and triphenylcarbonium tetrapentafluorophenylboron.

16. The olefin polymerization catalyst of claim 11, further comprising a carrier supporting the transition metal compound, the cocatalyst compound, or both.

17. The olefin polymerization catalyst of claim 16, wherein the carrier contains at least one selected from the group consisting of silica, alumina and magnesia.

18. The olefin polymerization catalyst of claim 16, wherein the total amount of the transition metal compound supported on the carrier is 0.001 to 1 mmole based on 1 g of the carrier, and the total amount of the cocatalyst compound supported on the carrier is 2 to 15 mmole based on 1 g of the carrier.

19. A method for preparing an olefin polymerization catalyst, comprising:

supporting the transition metal compound of claim 1; and a cocatalyst compound or both on a carrier.

* * * * *